(12) United States Patent
Nakamura et al.

(10) Patent No.: US 7,519,722 B2
(45) Date of Patent: Apr. 14, 2009

(54) INFORMATION PROVIDING METHOD, INFORMATION PROCESSING DEVICE, INFORMATION COLLECTION SYSTEM, COMMUNICATION METHOD, COMMUNICATION SYSTEM, RELAY DEVICE, AND COMMUNICATION DEVICE

(75) Inventors: Takatoshi Nakamura, Mie (JP); Akihiro Yokota, Mie (JP)

(73) Assignee: NTI, Inc., Mie (JP)

( * ) Notice: Subject to any disclaimer, the term of this patent is extended or adjusted under 35 U.S.C. 154(b) by 531 days.

(21) Appl. No.: 10/511,631

(22) PCT Filed: Apr. 23, 2003

(86) PCT No.: PCT/JP03/05205

§ 371 (c)(1), (2), (4) Date: Oct. 19, 2004

(87) PCT Pub. No.: WO03/092290

PCT Pub. Date: Nov. 6, 2003

(65) Prior Publication Data

US 2005/0198340 A1    Sep. 8, 2005

(30) Foreign Application Priority Data

Apr. 26, 2002    (JP)    ............... 2002-126848

(51) Int. Cl.
*G06F 15/16*    (2006.01)
*H04N 7/16*    (2006.01)

(52) U.S. Cl. .......................... 709/231; 725/9
(58) Field of Classification Search ........... 709/231; 725/9

See application file for complete search history.

(56) References Cited

U.S. PATENT DOCUMENTS 5,862,342 A * 1/1999 Winter et al. ............... 709/231
5,938,734 A * 8/1999 Yao et al. .................... 709/232

(Continued)

FOREIGN PATENT DOCUMENTS

JP    02-288637    11/1990

(Continued)

OTHER PUBLICATIONS

Ellis, T.J.; Black, J., "A multi-view surveillance system," Intelligence Distributed Surveillance Systems, IEE Symposium on (Ref. No. 2003/10062), vol., no., pp. 11/1-11/5, Feb. 26, 2003.*

(Continued)

*Primary Examiner*—Larry D Donaghue
*Assistant Examiner*—Ajay Bhatia
(74) *Attorney, Agent, or Firm*—Michael Bednarek; Paul, Hastings, Janofsky & Walker LLP

(57) ABSTRACT

The present invention relates to, for transmitting information by a server from an information gathering device to a terminal device, an information exchange method, an information processor, a communication method, a communication system, an intermediary device, and a communication device. It is directed to provide an information exchange method, an information processor, a communication method, a communication system, an intermediary device, and a communication device with which pieces of streaming video information gathered by a number of information gathering devices can be exchanged efficiently. A feature thereof lies in linking each of the terminal devices to the information gathering device that gathers a given number of pieces of streaming video information that are asked for from its linked terminal device, out of the plurality information gathering devices, directing the information gathering devices to deliver the given number of pieces of streaming video information directly to their linked terminal device, and producing and displaying, by the terminal devices, a predetermined certain screen including a given number of streaming video images that has been delivered.

17 Claims, 25 Drawing Sheets

U.S. PATENT DOCUMENTS

| | | | | |
|---|---|---|---|---|
| 5,977,967 | A | * | 11/1999 | Berner et al. ............... 715/826 |
| 5,996,023 | A | * | 11/1999 | Winter et al. ............... 709/253 |
| 6,470,392 | B1 | * | 10/2002 | Murase et al. ............... 709/231 |
| 6,954,859 | B1 | * | 10/2005 | Simerly et al. ............... 709/232 |
| 6,981,050 | B1 | * | 12/2005 | Tobias et al. ............... 709/231 |
| 7,284,064 | B1 | * | 10/2007 | Connelly ............... 709/231 |
| 2002/0097322 | A1 | * | 7/2002 | Monroe et al. ............... 348/159 |
| 2003/0145319 | A1 | * | 7/2003 | Sato ............... 725/14 |
| 2005/0198340 | A1 | * | 9/2005 | Nakamura et al. ............... 709/231 |
| 2006/0179463 | A1 | * | 8/2006 | Chisholm et al. ............... 725/90 |

FOREIGN PATENT DOCUMENTS

| | | |
|---|---|---|
| JP | 09081497 A * | 3/1997 |
| JP | 11-068744 | 3/1999 |
| JP | 11-088419 | 3/1999 |
| JP | 2001-007747 | 1/2001 |
| JP | 2001-282724 | 10/2001 |
| JP | 2001-313919 | 11/2001 |
| JP | 2001-320694 | 11/2001 |
| JP | 2002-044640 | 2/2002 |
| JP | 2002-335506 | 11/2002 |
| JP | 2003-018581 | 1/2003 |

OTHER PUBLICATIONS

Collins, R.T.; Lipton, A.J.; Kanade, T., "Introduction to the special section on video surveillance," Pattern Analysis and Machine Intelligence, IEEE Transactions on , vol. 22, No. 8, pp. 745-746, Aug. 2000.*

Marty Hall; Larry Brown, Core Web Programming, Second Edition, Combo Boxes and List Boxes, May 24, 2001, Section 18.6.*

English Language Abstracts of JP 11-88419 A, JP 11-68744 A, JP 2003-18581 A, JP 2001-282724 A, JP 2001-320694, JP 2001-7747A, JP 02-288637 A, JP 2002-44640 A, JP 2001-313919 A, JP 2002-335506 A.

* cited by examiner

FIG.6

| SELECTION CHANNEL | LINK DESTINATION ADDRESS |
|---|---|
| S 1 | A 1 |
| S 2 | A 2 |
| : | : |
| S k | A k |

| CHANNEL | GENRE CODE | URL |
|---|---|---|
| ch1 | 0 | http://www.aaa.jp/ |
| ch2 | 0 | http://www.bbb.jp/ |
| ch3 | 0 | http://www.ccc.jp/ |
| ch4 | 1 | http://www.ddd.jp/ |
| ⋮ | ⋮ | ⋮ |
| chN | 1 | http://www.xxx.jp/ |

| ROUTE NAME | IP ADDRESS | | |
|---|---|---|---|
| R1 | A11 | ... | A1m |
| : | : | : | : |
| Rn | An1 | ... | Anm |

| ROUTE | TIME PERIOD | RATE | RESPONSE TIME |
|---|---|---|---|
| R1 | T11~T12 | S1 | Tres1 |
| : | : | : | : |
| Rn | Tn1~Tn2 | Sn | Tresn |

FIG.23

| 911 | | CONTENT C1 | CONTENT C2 | CONTENT C3 | ⋮ |
|---|---|---|---|---|---|
| CHANNEL ch1 | CONTENT SERVER | URL11 | URL12 | URL13 | ⋮ |
| | CACHE TABLE ADDRESS | adr11 | adr12 (INVALID ADDRESS) | adr13 | ⋮ |
| | NODE SERVER | false | L2 | false | ⋮ |
| CHANNEL ch2 | CONTENT SERVER | URL21 | URL22 | URL23 | ⋮ |
| | CACHE TABLE ADDRESS | adr21 (INVALID ADDRESS) | adr22 | adr23 | ⋮ |
| | NODE SERVER | L21 | false | false | ⋮ |
| ⋮ | ⋮ | ⋮ | ⋮ | ⋮ | |

| ADDRESS | DIRECTORY NAME | VALIDITY | TIME STAMP |
|---|---|---|---|
| adr1 | d1 | × | — |
| .. | .. | .. | .. |
| adr11 | d11 | ○ | t11 |
| .. | .. | .. | .. |

FIG.25

| RANK | CONTENT | LINK DESTINATION | NUMBER OF RETRIEVALS | TIME | VOLUME |
|---|---|---|---|---|---|
| 1 | C1 | L1 (http://www.fff) | h1 | T1 | 10M |
| 2 | C2 | L2 (http://www.ggg) | h2 | T2 | 20M |
| 3 | C3 | L3 | h3 | T3 | 10M |
| .. | .. | .. | .. | .. | .. |

913

INFORMATION PROVIDING METHOD, INFORMATION PROCESSING DEVICE, INFORMATION COLLECTION SYSTEM, COMMUNICATION METHOD, COMMUNICATION SYSTEM, RELAY DEVICE, AND COMMUNICATION DEVICE

TECHNICAL FIELD

The present invention relates to an information exchange method, an information processor, an information gathering system, a communication method, a communication system, an intermediary device, and a communication device, and more particularly, for transmitting information by a server from an information gathering device to a terminal device, to an information exchange method, and an information processor, an information gathering system, a communication method, a communication system, an intermediary device, and a communication device.

BACKGROUND ART

FIG. 1 is a diagram showing a system configuration of a conventional information exchange system.

Conventional information exchange system 1 is configured in such a manner that information gathering devices 11-1 to 11-$n$, a server 12, and terminal devices 13-1 to 13-$m$ are allowed to communicate with each other through a network 14.

The information gathering devices 11-1 to 11-$n$ may be, for example, video cameras that take pictures of their surroundings to collect pieces of live streaming video image information. It should be noted that the information gathering devices 11-1 to 11-$n$ may be those that provide pieces of streaming video information in real time.

The n pieces of real-time and/or live streaming video image information gathered by the information gathering devices 11-1 to 11-$n$ are supplied to the server 12 through the network 14. The server 12 distributes and delivers these pieces of real-time and/or live streaming video image information gathered by the information gathering devices 11-1 to 11-$n$ to the individual terminal devices 13-1 to 13-$m$, in answer to a request from the terminal devices 13-1 to 13-$m$.

It should be noted that the conventional information gathering systems of the type described are designed for cases where the number of pieces of the streaming video image information to be exchanged is more overwhelming than the number of users, so the server 12 is required to have a high processing capacity.

To this end, the conventional information exchange methods of the type described collect the pieces of streaming video information gathered by the information gathering devices 11-1 to 11-$n$ on the server 12 before distributing and delivering them to the terminal devices 13-1 to 13-$m$ in answer to their requests. Therefore, problems lie in that it causes huge processing loads on the server 12.

In addition, the server 12 is accessed by all terminal devices 13-1 to 13-$m$ that ask for the pieces of streaming video information gathered by the information gathering devices 11-1 to 11-$n$. Problems lie in that increase in the number of the terminal devices 13-1 to 13-$m$ gradually reduces the communication rate and, in some cases, may cause missing frames from the streaming video information.

FIG. 2 is a diagram for explaining the operation of a conventional content exchange system.

A content exchange system 20 is configured in such a manner that a client 21 and a server 22 are allowed to communicate with each other through a network 23. Upon a request from the client 21 to the server 22, the server 22 provides the client 21 with a content that is asked for by the client 21 through the network 23.

In this event, a user should work on his or her client 21 to find a server 22 which includes a content that he or she needs and access that server 22. In addition, he or she cannot choose a communication route from the client 21 to the server 22.

In the network 23, individual routers Rt can automatically determine the optimum route for communication, and data are transmitted through the communication route selected by these routers Rt.

As apparent from the above, any clients 21 wanting to obtain necessary content(s) should access a certain server 22 in the conventional content exchange system 20, and they should find the server 22 which stores the content(s) they want. Therefore, problems lie in that user's operation becomes complicated.

In addition, in the conventional content exchange system 20, a communication route is automatically selected by the routers Rt included in the network 23. The routers Rt determine the optimum path depending on the traffic over their surrounding communication paths. They do not take into account the traffic on the downstream paths. Consequently, the overall communication rate of a selected route could possibly be slow. This means that the entire routing is not taken into account.

The present invention was made with respect to the above-mentioned issues, and an object thereof is to provide an information exchange method, an information processor, and an information gathering system with which pieces of streaming video information gathered by a number of information gathering devices can be exchanged efficiently.

In addition, the present invention was made with respect to the above-mentioned issues, and an object thereof is to provide a communication method, a communication system, an intermediary device, and a communication device with which a content that is asked for by a client can be obtained at a high speed.

SUMMARY OF THE INVENTION

The present invention is featured in linking each of the terminal devices to the information gathering device that gathers a given number of pieces of streaming video information that are asked for from its linked terminal device, out of the plurality information gathering devices, directing the information gathering devices to deliver the given number of pieces of streaming video information directly to their linked terminal device, and producing and displaying, by the terminal devices, a predetermined certain screen including a given number of streaming video images that has been delivered.

According to the present invention, the streaming video information is supplied to the terminal devices directly from the information gathering device(s) that are selected by a user. The server is not required to handle the streaming video information, so that operations in the server will be reduced. Each terminal device directly accesses a selected information gathering device or devices. Consequently, the access to the information gathering devices is spread. The capacity of the information gathering devices is not necessary to be increased.

The present invention is also featured in that the server obtains a link destination address of the respective information gathering devices that gather the given number of streaming video images that are asked for from the terminal devices and notifies the terminal devices of their corresponding link destination addresses, each of the terminal devices being adapted to access the information gathering device specified by the link destination address that is obtained from the server in order to directly obtain a predetermined piece of streaming video information.

According to the present invention, the server is only required to obtain the link destination address of the respective information gathering devices that gather the given number of streaming video images that are asked for from the terminal devices and notifies the terminal devices of their corresponding link destination addresses. This reduces process loads.

In addition, the present invention is featured in that the server makes a request to each of the information gathering devices that gather a given number of streaming video images that are asked for from each of the terminal devices, the information gathering devices being directed to supply directly to their linked terminal devices the streaming video information in response to a request from the server.

According to the present invention, the server makes a request to each of the information gathering devices, and the information gathering devices are directed to supply directly to their linked terminal devices the streaming video information in response to a request from the server. This reduces the number of communication steps performed between the server and the terminal devices. Streaming video information can thus be exchanged at a high speed.

According to the present invention, the server makes a request to each of the information gathering devices, and the information gathering devices are directed to supply directly to their linked terminal devices the streaming video information in response to a request from the server, thereby the number of communication steps performed between the server and the terminal devices can be reduced and streaming video information can thus be exchanged at a high speed.

Furthermore, the present invention is featured in that each of the terminal devices accesses its linked information gathering device(s) according to a link destination setting table received by the server.

According to the present invention, the server sends the link destination setting table to the terminal devices, and each of the terminal devices accesses its linked content server(s) according to the link destination setting table. This prevents access concentration to a certain content server out of the content servers, so that loads on the content servers can be spread.

In addition, the present invention is featured in comparing the link destination setting table that is previously held therein with the link destination setting table that is sent from the terminal devices upon access to their linked information gathering devices in order to control access by the terminal devices.

According to the present invention, access control can be ensured by means of performing authorization using the link destination setting table received from the server.

In addition, the present invention is featured in a communication method for transmitting packets between a client and a server through a plurality of intermediary devices, comprising: performing communications more than once by using a certain command between the client and the server; detecting a communication route of the certain command by means of measuring a communication performance during the communications and adding the addresses of the intermediary devices to the certain command on an add-per-passage basis; and performing communications between the client and the server through the communication route which yields the maximum communication performance with respect to the communication route.

According to the present invention, communications can be done through the communication route which yields the maximum communication performance. This allows comfortable communication.

Moreover, the present invention is featured in an intermediary device which intermediates a client and a server, comprising: command detection means for detecting a certain command that is transmitted between the client and the server; route information detection means for detecting route information contained in communication data that are transmitted between the client and the server; and intermediacy control means which is adapted to send the certain command to a network after adding its local address to it when the certain command is detected, the intermediacy control means relaying the communication data when its local address is contained in the route information detected by the route information detection means.

According to the present invention, each of the intermediary devices add its local address to the certain command, which makes it possible to identify a communication route between a client and the server. In addition, the route information contained in the communication data is recognized by the intermediary device to relay the communication data. This makes it possible to transmit the communication data through the communication route according to the route information.

The present invention is a communication system for performing communications between a client and a server through a network, comprising: bypassing means which allows communication between the client and the server while bypassing the network.

The present invention is featured in comprising: measuring means for measuring a communication performance between the client and the server; and communication control means that causes the bypassing means to bypass the network when the communication performance measured by the measuring means is lowered under a certain level.

According to the present invention, communication can be performed at a high speed by means of bypassing the network using the bypassing means when a communication performance during the communication between a client and the server is not good.

The present invention is featured in a communication system for performing communications between a client and a server through a network, wherein the server comprises a node server adapted to accept a request from the client; and a content server adapted to send, to the client, a content that is asked for by the client in answer to a request from the node server.

The present invention is featured in a communication system for performing communications between a client and a server through a network, wherein the server comprises a content server which provides a content to the client; and a node server adapted to accept a request from the client and to provide the client with link destination information of the content server that stores a content that is asked for by the client; the client being adapted to ask for a content to the content server according to the link destination information from the node server.

According to the present invention, burdens of operations can be divided among the node server(s) and the content server(s).

The present invention is featured in that the node server has a hierarchical structure based on the content or its link destination; the node server having a function to backup information about contents managed by node servers at upper and lower levels.

According to the present invention, by configuring the node servers in a hierarchical structure based on the clients that access thereto. This reduces process loads of the individual node servers.

The present invention is featured in a communication device for performing communications with a client through a network, the communication device being adapted to provide a content to the client by means of accessing a content server that provides content in answer to a request from the client, comprising: caching means for caching contents in the content server according to the frequency of accesses from the client; the communication device being adapted to send, to the client, a cashed content in answer to a request from the client.

According to the present invention, the contents in the content server are cached in the node server according to the frequency of accesses from the client. This makes it possible to deliver a content from the node server to the client without passing through the content server. Therefore, it is possible to provide a content to the client at a high speed.

BRIEF DESCRIPTION OF THE DRAWINGS

FIG. 6 is a diagram showing a data structure of a link destination information region 123$b$;

FIG. 12 is a diagram showing a data structure of a link destination setting table;

FIG. 17 is a diagram showing a data structure of a route table;

FIG. 18 is a diagram showing a data structure of a route information table;

FIG. 23 is a diagram showing a data structure of an address table;

FIG. 24 is a diagram showing a data structure of a cache table;

FIG. 25 is a diagram showing a data structure of a statistics table;

BEST MODE FOR CARRYING OUT THE INVENTION

First Embodiment

Figure 1:
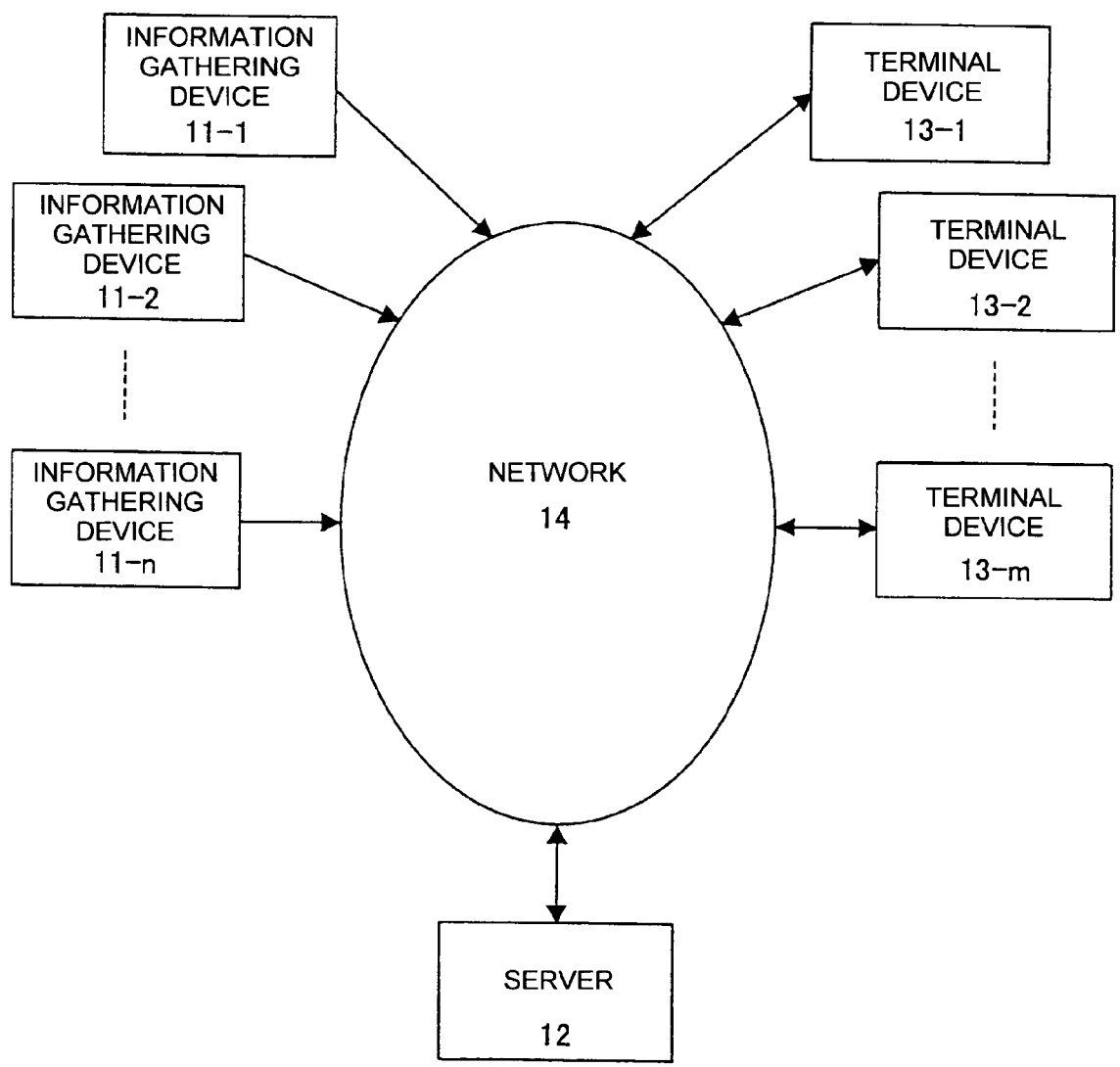
FIG. 1 is a diagram showing a system configuration of a conventional information exchange system.
Figure 2:
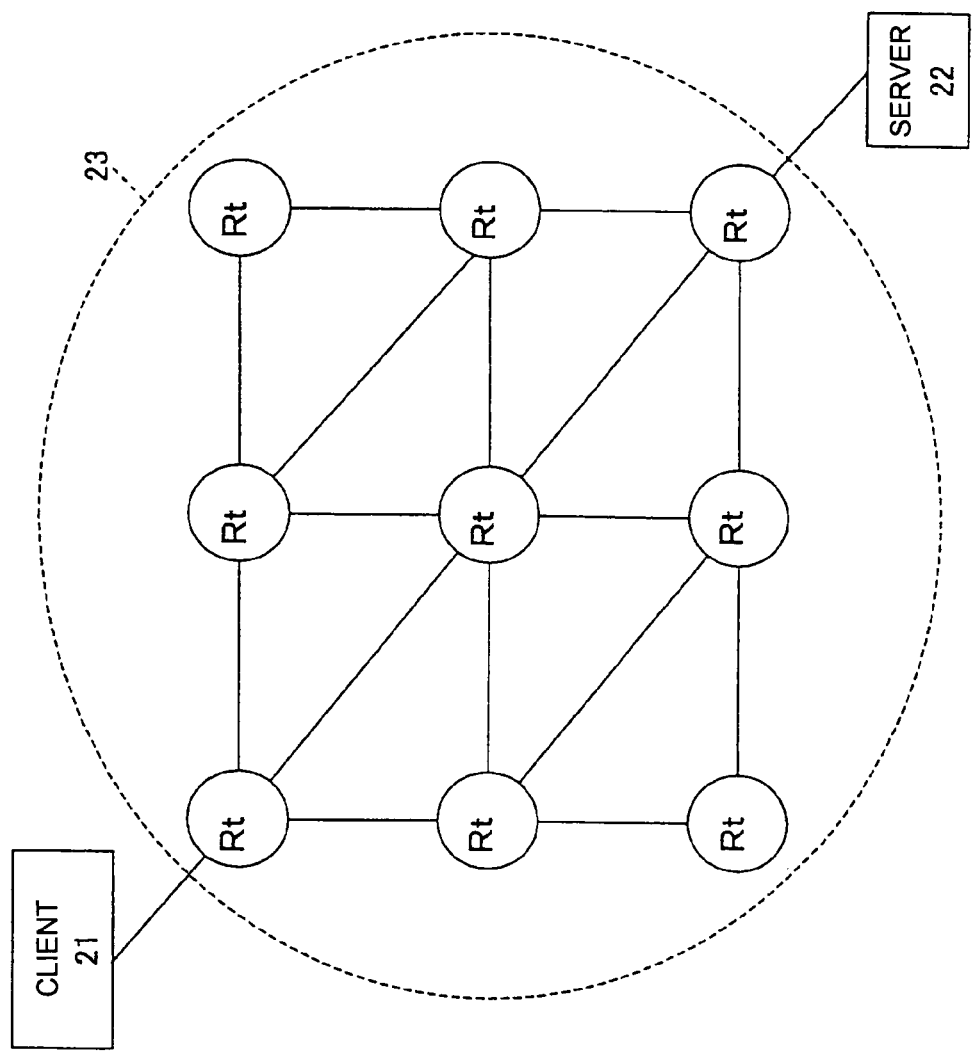
FIG. 2 is a diagram showing a system configuration of a conventional content exchange system.
Figure 3:
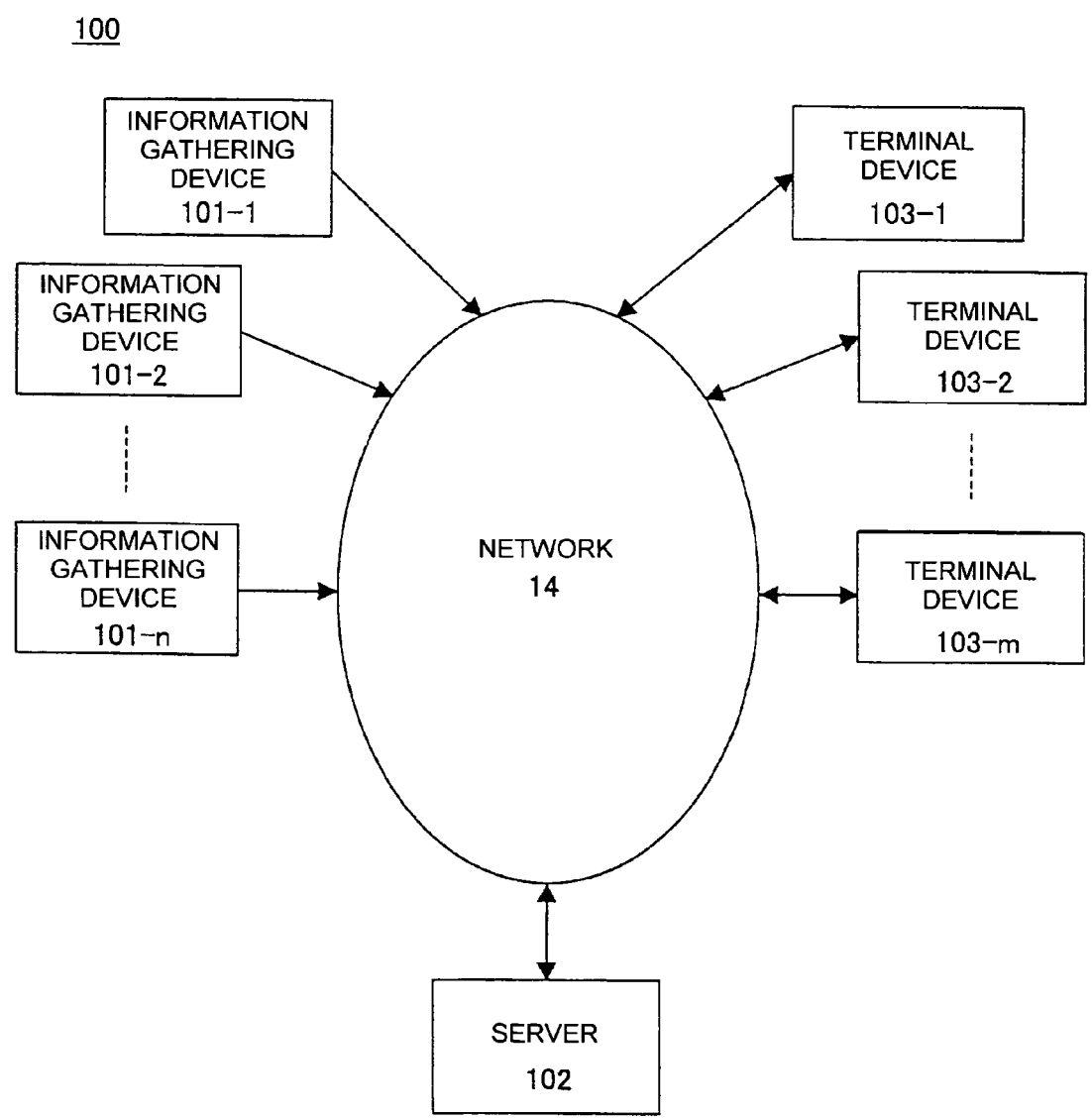
FIG. 3 is a diagram showing a system configuration according to a first embodiment of the present invention.

FIG. 3 is a diagram showing a system configuration according to a first embodiment of the present invention. In this figure, similar components and parts to those illustrated in FIG. 1 are depicted by like reference numerals, and descriptions thereof will be omitted.

The difference of an information exchange system 100 of this embodiment from the conventional systems lies in operations of information gathering devices 101-1 to 101-$n$, a server 102, and terminal devices 103-1 to 103-$m$.

In the information exchange system 100 according to this embodiment, when one terminal device 103-$i$ of the terminal devices 103-1 to 103-$m$ asks for a content to the server 102, the server 102 returns a link destination to the terminal device 103-$i$. The terminal device 103-$i$ obtains a content directly from the linked information gathering devices 101-1 and 101-2 of the information gathering devices 101-1 to 101-$n$ and displays the content.

First, a configuration of a predetermined terminal device 103-$i$ of the terminal devices 103-1 to 103-$m$ is described.

Figure 4:
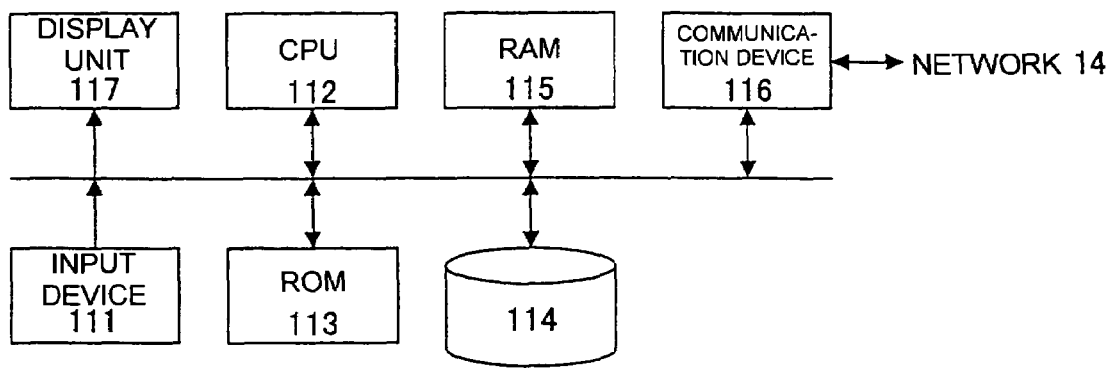
FIG. 4 is a block diagram of a terminal device 103-$i$.

FIG. 4 is a block diagram of the terminal device 103-$i$.

The terminal device 103-$i$ is configured having an input device 111, a CPU 112, a ROM 113, a hard disk drive 114, a RAM 115, a communication device 116, and a display unit 117.

The input device 111 may be a keyboard or a mouse that is used for command or data input. The CPU 112 performs data processing according to a program stored in the ROM 113 and the hard disk drive 114. In the ROM 113, programs such as BIOS and initial setting information are stored. In the hard disk drive 114, program and data such as a player for displaying a streaming video image from a plurality of information gathering devices 101-1 to 101-$n$ are stored. The RAM 115 is used as a temporary storage area for the CPU 112.

The communication device 116 performs communication control with the network 14. The display unit 117 may be a CRT or an LCD on which contents and so on are displayed.

Next, a configuration of the server 102 is described.

Figure 5:
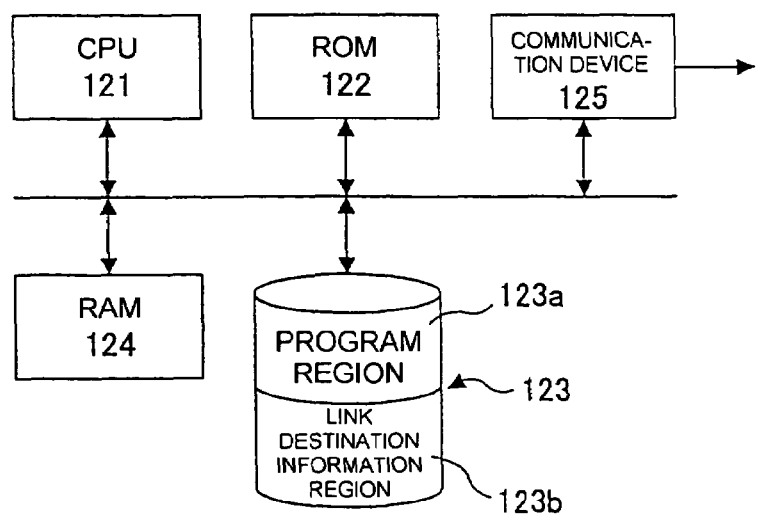
FIG. 5 is a block diagram of a server 102.

FIG. 5 is a block diagram of the server 102.

The server 102 is configured having a CPU 121, a ROM 122, a hard disk drive 123, a RAM 124, and a communication device 125. The CPU 121 processes the information according to a program stored in the ROM 122 and the hard disk drive 123. In the ROM 122, BIOS and various setting values are stored.

The hard disk drive 123 is configured having a program region 123a and a link destination information region 123b. The program region 123a stores a program that is used for finding the link destination information region 123b, determining a link destination, and notifying the terminal device 103-i of it, according to a request from the terminal device 103-i as will be described below.

FIG. 6 is a diagram showing a data structure of the link destination information region 123b.

The link destination information region 123b has a structure in which link destination addresses A1 to Ak are defined for respective selection channels S1 to Sk. By designating a selection channel Sk, a corresponding link destination address Ak can be determined.

The RAM 124 is used as a temporary storage area for the CPU 121. The communication device 125 performs communication control with the network 14.

Next, a configuration of one information gathering device 101-i of the information gathering devices 101-1 to 101-n is described.

Figure 7:
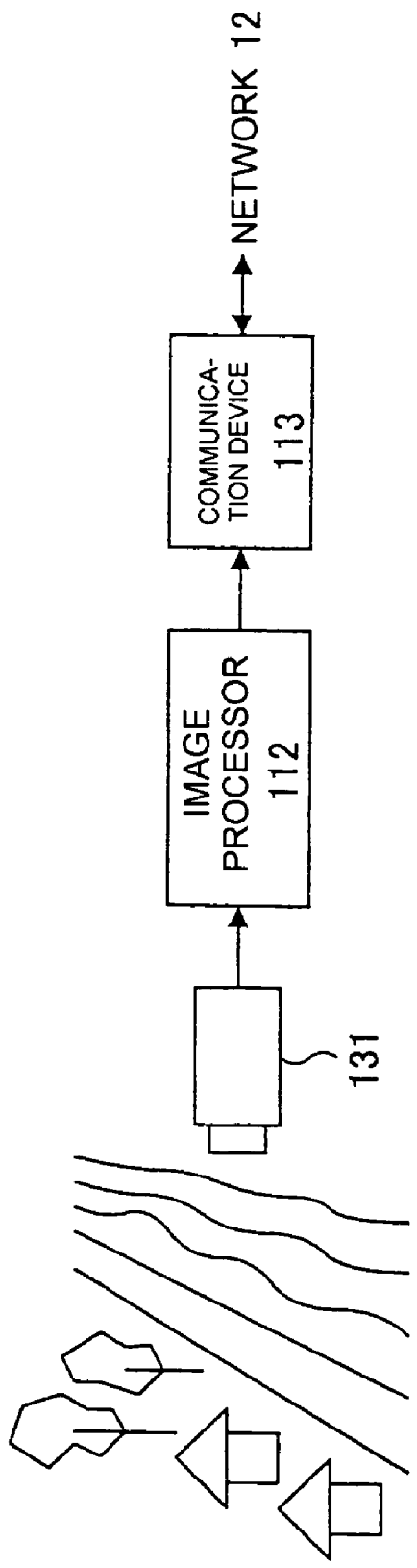
FIG. 7 is a block diagram of an information gathering device 101-$i$.

FIG. 7 is a block diagram of the information gathering device 101-i.

The information gathering device 101-i is configured having a video camera unit 131, an image processor 132, and a communication device 133.

The video camera unit 131 takes streaming video images of its surroundings. The streaming video images taken by the video camera unit 131 are supplied to the image processor 132. The image processor 132 performs operations, such as compression operations, necessary for the transmission of the streaming video images on the information of the streaming video images taken by the video camera unit 131. The streaming video image information processed by the image processor 132 is supplied to the communication device 133. The communication device 133 performs operations to send the streaming video image information to the terminal device 103-i through the network 14 according to a request from the terminal device 103-i, as will be described below.

Next, an operation for a case where a plurality of channels are selected by the terminal device 103-i is described with reference to the drawings.

Figure 8:
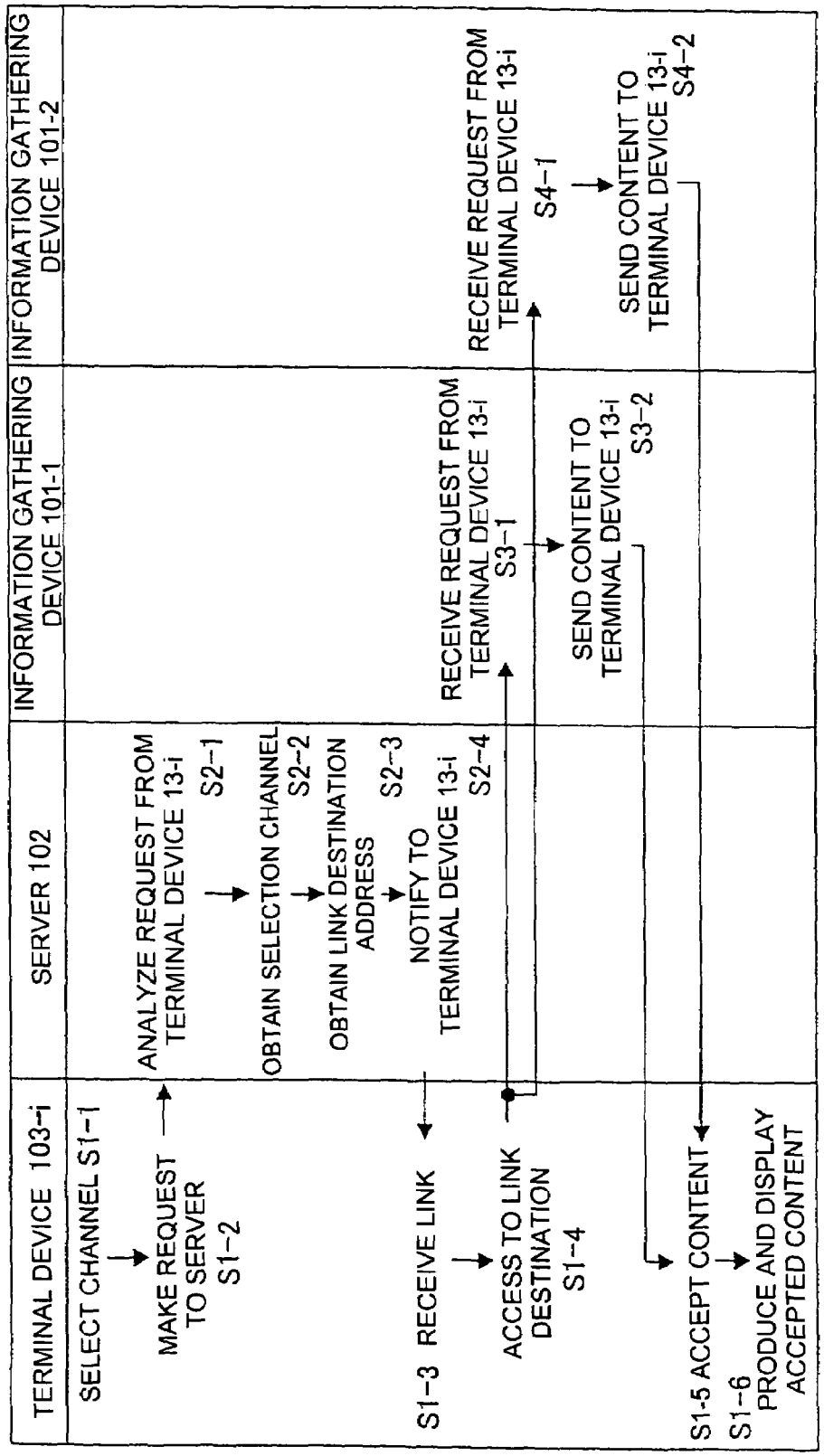
FIG. 8 is a process flowchart according to the first embodiment of the present invention.

FIG. 8 is a process flowchart according to one embodiment of the present invention.

First, when a player is run on the terminal device 103-i, a player screen is displayed.

Figure 9:
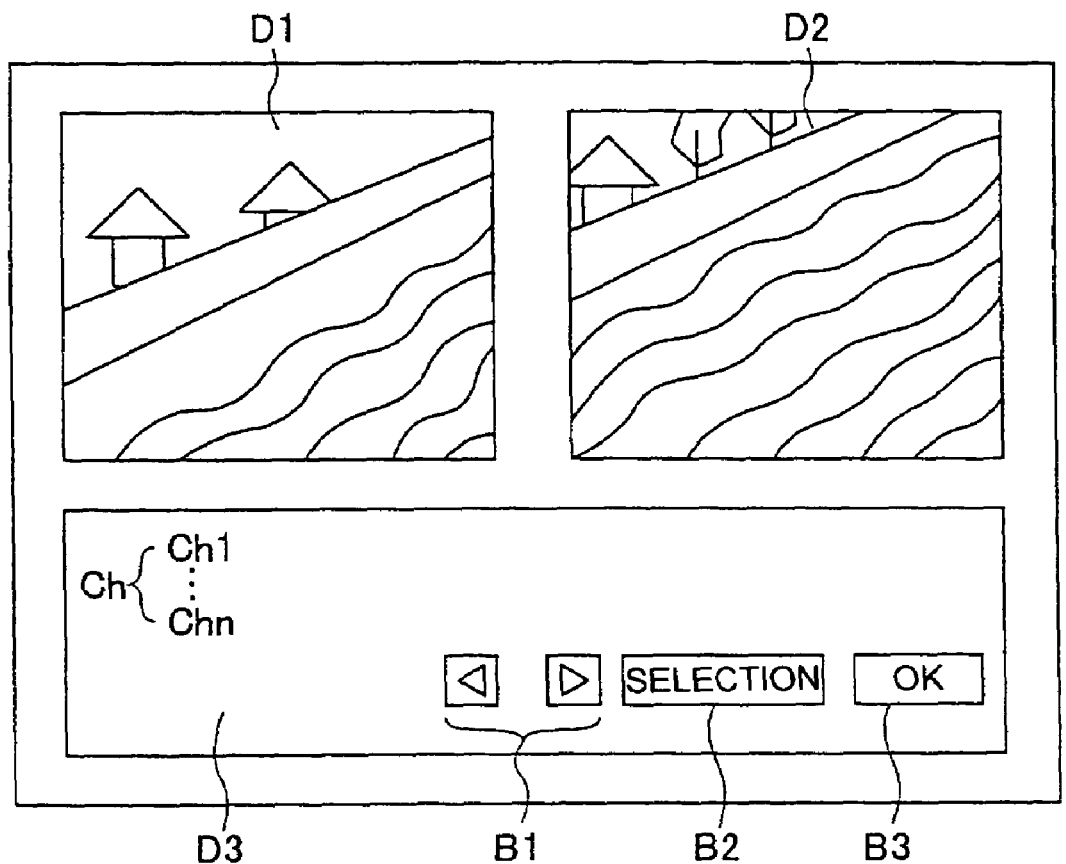
FIG. 9 is a view illustrating a player screen.

FIG. 9 is a view showing a player screen.

The player screen includes streaming video image display sections D1 and D2 and a channel menu display section D3.

For example, in the streaming video image display section D1, a streaming video image from one information gathering device of the information gathering devices 101-1 to 101-n is displayed. In addition, in the streaming video image display section D2, a streaming video image from one information gathering device of the information gathering devices 101-1 to 101-n is displayed.

Furthermore, in the channel menu display section D3, a channel list Lch, a channel selection button B1, a selection button B2, and an OK button B3 are displayed.

First, a user selects a channel through which he or she wants to receive streaming video images, on the player screen in step S1-1. In response to this, the terminal device 103-i sends a request to the server 102 in step S1-2. This request includes a selection channel information that is used by the user to fix the desired channel.

The user refers to a channel list Lch in the channel menu display section D3, and uses the channel selection button B1 to select a desired channel. Then, he or she uses the selection button B2. By activation of the selection button B2, the channel to be displayed on the streaming video image display section D1 is selected. The channel to be displayed on the streaming video image display section D2 is also selected. Next, after the selection of the channels to be displayed on the streaming video image display sections D1 and D2, the user sends a request to the server 102 by using the OK button B3.

After accepting the request including the selection channel information from the terminal device 103-i in step S2-1, the server 102 analyzes the accepted request and obtains the selection channel information, in step S2-2. Next, the server 102 looks for the link destination information region 123b according to the selection channel information and obtains a link destination address in step S2-3. Subsequently, the server 102 notifies the terminal device 103-i of the link destination address, in step S2-4.

After accepting the link destination address for the selected channel from the server 102 in step S1-3, the terminal device 103-i asks for a content from a device or devices identified by the accepted link destination address, such as the information gathering devices 101-1 and 101-2, in step S1-4.

After accepting the request from the terminal device 103-i in step S3-1, the information gathering device 101-1 sends the content, that is, the streaming video image information that is taken by the video camera unit 131, to the terminal device 103-i, in step S3-2. Likewise, after accepting the request from the terminal device 103-i in step S4-1, the information gathering device 101-2 sends the content, that is, the streaming video image information that is taken by the video camera unit 131, to the terminal device 103-i, in step S4-2.

After receiving the contents, i.e., the pieces of streaming video image information, from the information gathering devices 101-1 and 101-2 in step S1-5, the terminal device 103-i produces the player screen with the received streaming video images and displays the result, in step S1-6.

With the above-mentioned process, the streaming video images on the selected channels, i.e., the streaming video images collected by the information gathering devices 101-1 and 101-2 are displayed in real time on the terminal device 103-i. In this event, the pieces of streaming video image information are directly supplied from the information gathering devices 101-1 and 101-2 to the terminal device 103-i. The terminal devices 103-1 to 103-m access the server 102 only for the purpose of obtaining a link destination address. This can reduce the process load on the server 102.

If, for example, there are a number of information gathering devices 101-1 to 101-n, the terminal devices 103-1 to 103-m are less likely to flock to one information gathering device and, accordingly, it is expected that the access from the terminal devices 103-1 to 103-m is spread across them. The capacity of the information gathering devices is not necessary to be increased.

In the terminal device 103-i, contents from the information gathering devices 101-1 to 101-2, i.e., the pieces of streaming video image information are combined with a predetermined screen specified by the player and displayed. The resulting representation causes the user of the terminal device 103-i to feel as if he or she accesses the server 101-2. The user is not aware that the streaming video information is directly sent from the information gathering devices 101-1 to 102.

In this embodiment, when the terminal device 103-i makes a request to the server 102, the server 102 notifies the terminal device 103-i of the link destination address, and the terminal device 103-i accesses the information gathering devices 101-1 and 101-2 to obtain streaming video images. However, the server 102 may directly make a push request to the information gathering devices 101-1 and 101-2 to be linked, and each of the information gathering devices 101-1 and 101-2 may send streaming video image information to the terminal device 103-i.

Figure 10:
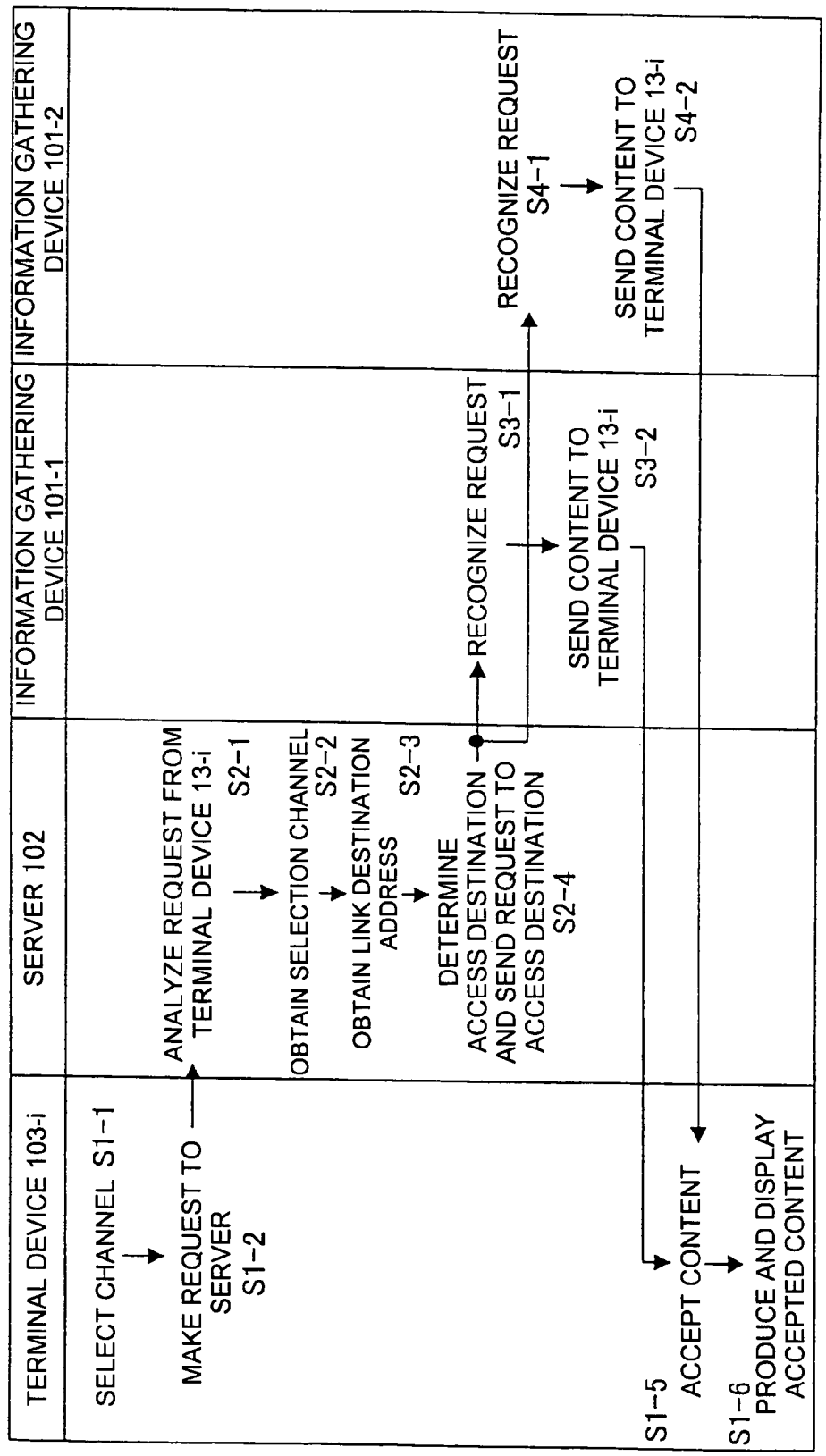
FIG. 10 is a process flowchart of a modified version of the first embodiment of the present invention.

FIG. 10 shows a process flowchart of a modified version of the first embodiment of the present invention. In the figure, similar operations and steps to those in FIG. 8 are depicted by like reference numerals, and description thereof will be omitted.

In this modified version, when the server 102 obtains an access destination address in step S2-3, the server 102 makes a push request to the information gathering devices 101-1 and 101-2 designated by the link destination addresses, in step S2-11.

After accepting the push request from the server 102 in the steps S3-1 and S4-1, the information gathering devices 101-1 and 101-2 send a streaming video image to the terminal device 103-i according to the push request from the server 102, in the steps S3-2 and S4-2, respectively.

According to this modified version, communication with the terminal device 103-i can be simplified.

The information exchange system 100 of this embodiment works better on cases where a number of information gathering devices are contained. For example, good results can be achieved when the information gathering devices are surveillance cameras along a river.

River monitoring is performed over a wide range of areas. A number of surveillance cameras are required for this purpose. It is impossible to monitor the images from these surveillance cameras altogether. In such a case, monitoring on the district basis provides better effects.

However, if the images from many surveillance cameras are managed altogether in the server 102 and are divided for districts as was done conventionally, the process load on the server 102 will increase. This raises the need to enhance the capacity of the server 102 and the communication lines.

On the contrary, in this embodiment, the terminal devices 103-1 to 103-m obtains the real-time and/or live streaming video images directly from the information gathering devices 101-1 to 101-n, so that the server 102 is not required to process the real-time and/or live streaming video images and distribute them to the individual terminal devices 103-1 to 103-m. This reduces process load on the server 102. In addition, it is unnecessary for the server to transmit large volumes of data such as streaming video images, eliminating. This eliminates the necessity of widening the band of, for example, communication lines. The just-mentioned advantages ensure reliable delivery of necessary information and allow inexpensive configuration of a system.

Furthermore, the real-time or/and live streaming video images are supplied directly from the surveillance cameras as the information gathering devices 101-1 to 101-n to the terminal devices 103-1 to 103-m. Unless the access to a certain information gathering device, that is, a certain surveillance camera of the information gathering devices 101-1 to 101-n, is increasing, traffic concentration on the information gathering device can be avoided, so that problems such as frame dropouts will not occur. All pieces of information can thus be obtained without fail.

This embodiment assumes a case where the access to a certain information gathering device is not extremely increased, that is, a case where the number n of the information gathering devices is relatively larger than the number m of the terminal devices. It works better on such situations. For example, this applies to cases where there are a number of information gathering devices and where there are a lot of locations to be covered for security monitoring, for example, over a large area such as rivers, schools, offices, and factories, which are difficult to be monitored at the same time.

This embodiment avoids extreme concentration of access to a certain information gathering device. Real-time and/or live streaming video information can be reproduced without frame dropouts. Therefore, it is suitable for monitoring associated with anticrime or disaster-prevention purposes.

It should be noted that pieces of real-time or/and live streaming video information are supplied from the information gathering devices 101-1 to 101-n to the terminal device 103-i and are displayed thereon. However, information other than video information, such as disaster-prevention/anticrime information, community information, administrative information, environmental information, and infrastructural information, may be supplied from the server 102 and displayed.

In addition, this embodiment has been described in conjunction with the case where a plurality of streaming video images are displayed on a predetermined screen defined by the player in the terminal devices 103-1 to 103-m. However, two or more streaming video images may be displayed on different screens.

Alternatively, the terminal devices 103-1 to 103-m may be provided from the server 102 with a link destination setting table in which link destinations are dispersed so that process loads of the information gathering devices 101-1 to 101-n are distributed, and a predetermined terminal device 103-i of the terminal devices 103-1 to 103-m may be allowed to link only to the information gathering device 101 that is specified in the link destination setting table, in order to distribute the process loads of the information gathering devices 101-1 to 101-n.

Figure 11:
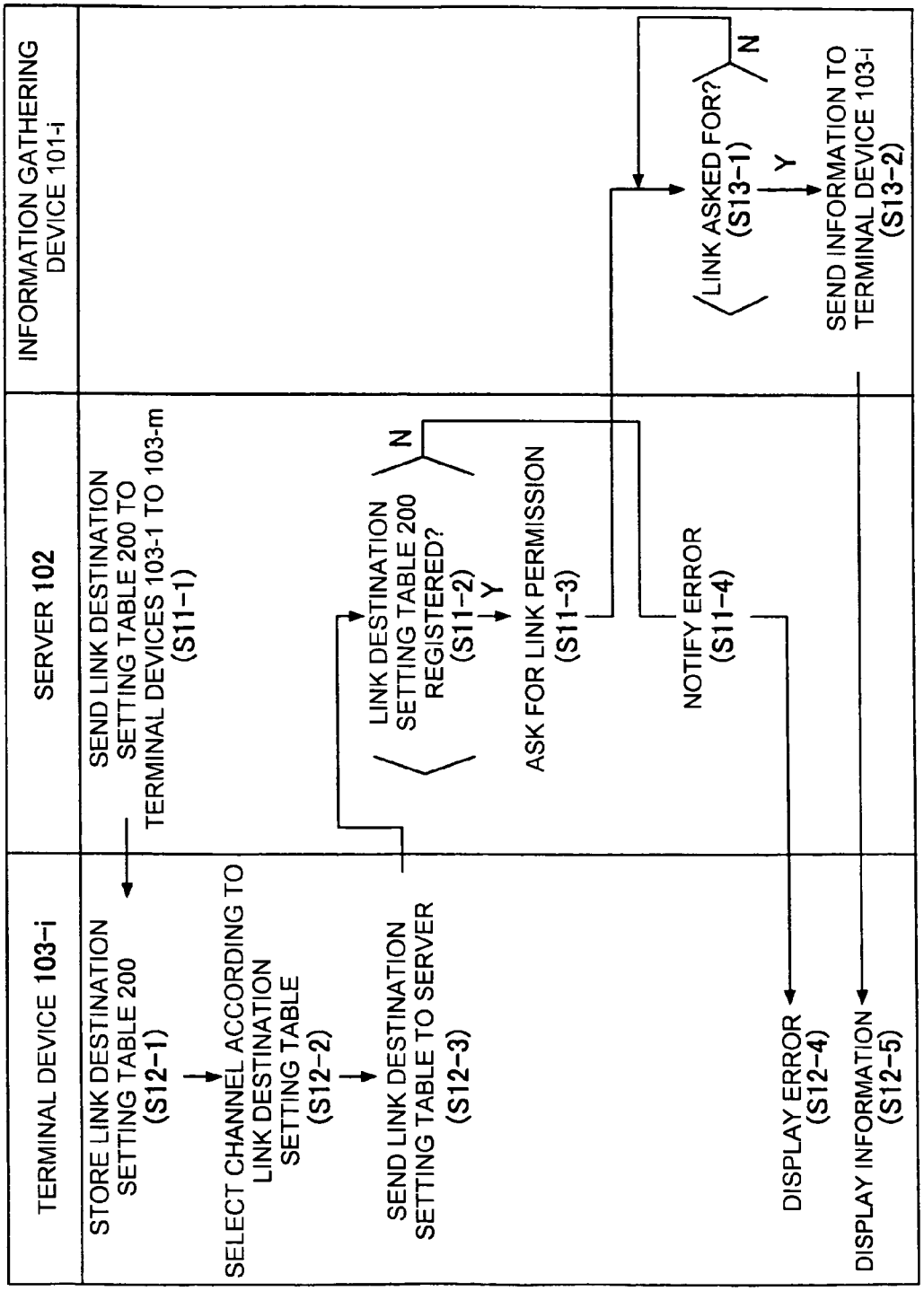
FIG. 11 is a process flowchart of a second modified version.

FIG. 11 shows a process flowchart of the second modified version.

The server 102 sends a link destination setting table to the terminal devices 103-1 to 103-m, in step S11-1.

FIG. 12 is a diagram showing a data structure of a link destination setting table.

A link destination setting table 200 includes genre codes and link destination URLs for respective channels stored therein. Different patterns of link destination setting table 200 are defined for the terminal devices 103-1 to 103-m. For example, they are defined with different combinations of channels and links.

A predetermined terminal device 103-i of the terminal devices 103-1 to 103-m stores the link destination setting table from the server 102, in step S12-1. The terminal devices 103-1 to 103-m are allowed to gather desired information from the link destination setting table 200.

When a user selects a channel that he or she wants to watch and listen from the link destination setting table 200 in step S12-2, a predetermined terminal device 103-i of the terminal devices 103-1 to 103-m sends, to the server 102, the selected channel along with the link destination setting table 200, in step S12-3. The server 102 determines, in step S11-2, whether the link destination setting table 200 from the terminal device 103-i is previously registered or not.

When step S11-2 indicates that the link destination setting table 200 is the one that is previously registered, the server 102 permits transmittance of information from the terminal device 103-i and the information gathering device 101-i on the selected channel, in step S11-3.

When step S11-2 indicates that the link destination setting table 200 is not a previously registered one, the server 102 notifies the terminal device 103-i of an error, in step S11-4. In response to the reception of the notification of error from the server 102, the terminal device 103-i displays the error, in step S12-4.

In this way, the different patterns of link destination setting table 200 for the terminal devices 103-1 to 103-m allow authentication using the link destination setting table 200. It should be noted that unauthorized access can be prevented by updating the link destination setting table 200 regularly.

When linking is permitted and a link request is received from the server 102 in step S13-1, the information gathering device 101-i sends the information such as a real-time image gathered in step S13-2 to the terminal device 103-i.

After receiving the gathered pieces of information from the information gathering device 101-i in step S12-5, the terminal device 103-i displays the received information in a predetermined small area within a display window.

Although the server 102 manages the link destination setting table 200 in this embodiment, it may be managed by the information gathering devices 101-1 to 101-i. By managing the link destination setting table 200 on the information gathering devices 101-1 to 101-i, even when the system on the server 102 is out of service, the information gathering devices 101-1 to 101-i can perform authentication operation and provide the gathered information.

The above embodiment has thus been described in conjunction with an example of the river surveillance cameras, but it is not limited thereto. The information gathering devices 101-1 to 101-i may be replaced with the content server to deliver a desired content or contents.

According to this modified version, the server 102 sends the link destination setting table 200 to the terminal devices 103-1 to 103-m, and each of the terminal devices 103-1 to 103-m accesses the information gathering devices 101-1 to 101-n according to the link destination setting table 200. Access concentration to a certain information gathering device of the information gathering devices 101-1 to 101-n will not occur, allowing distribution of the loads of the information gathering devices 101-1 to 101-n.

Furthermore, according to this modified example, by performing authentication using the link destination setting table 200 supplied from the server 102, access control can be done surely. In addition, this modified example can be applied to a push request.

Second Embodiment

Figure 13:
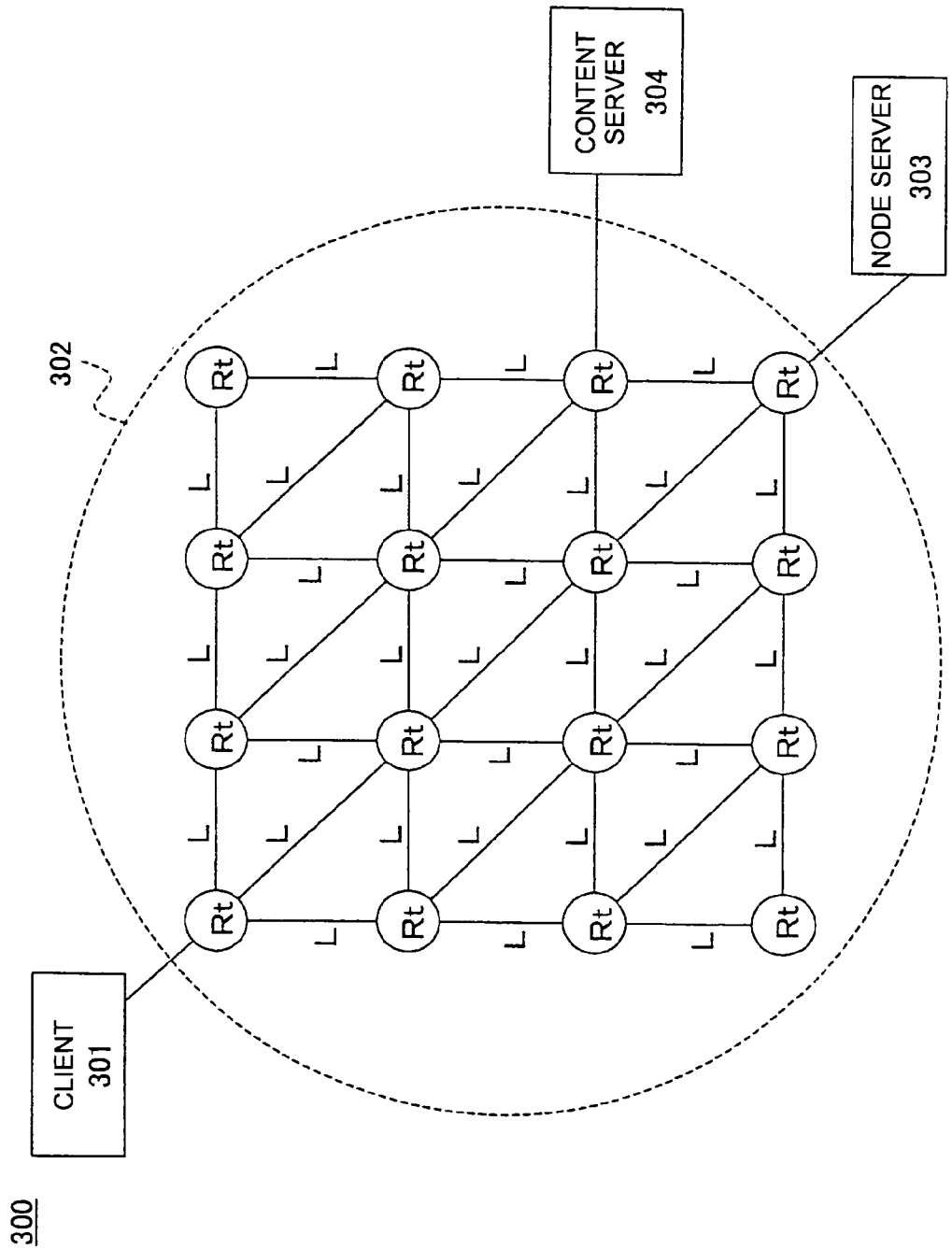
FIG. 13 is a diagram showing a system configuration of a content exchange system according to a second embodiment of the present invention.

FIG. 13 is a diagram showing a system configuration of a second embodiment of the present invention.

A content exchange system 300 of this embodiment is configured having a client 301, a network 302, a node server 303, and a content server 304.

The client 301 makes a request to the node server 303 through the network 302. The node server 303 makes a push request to the content server 304 in response to the request from the client 301.

The content server 304 sends the content to the client 301 through the network 302 in response to the push request from the node server 303. The client 301 displays the content from the content server 304. It should be noted that the node server 303 may let a link destination reply in response to a request from the client 301 and the client 301 may have direct access to the content server 304 to provide the content to the client 301.

In addition, the network 302 has a net-like structure of communication routes L connecting a plurality of routers Rt. The router Rt finds the optimum communication route L according to the destination IP address of a received packet, and sends the received packet to the communication route L.

Here, the system of this embodiment is configured in such a manner that the route from the client 301 to the node server 303 or the route from the content server 304 to the client 301 can be determined previously. The route to be used is determined by means of sending a routing command from the client 301 to the node server 303 or from the content server 304 to the client 301.

First, the routing command is described.

Figure 14:
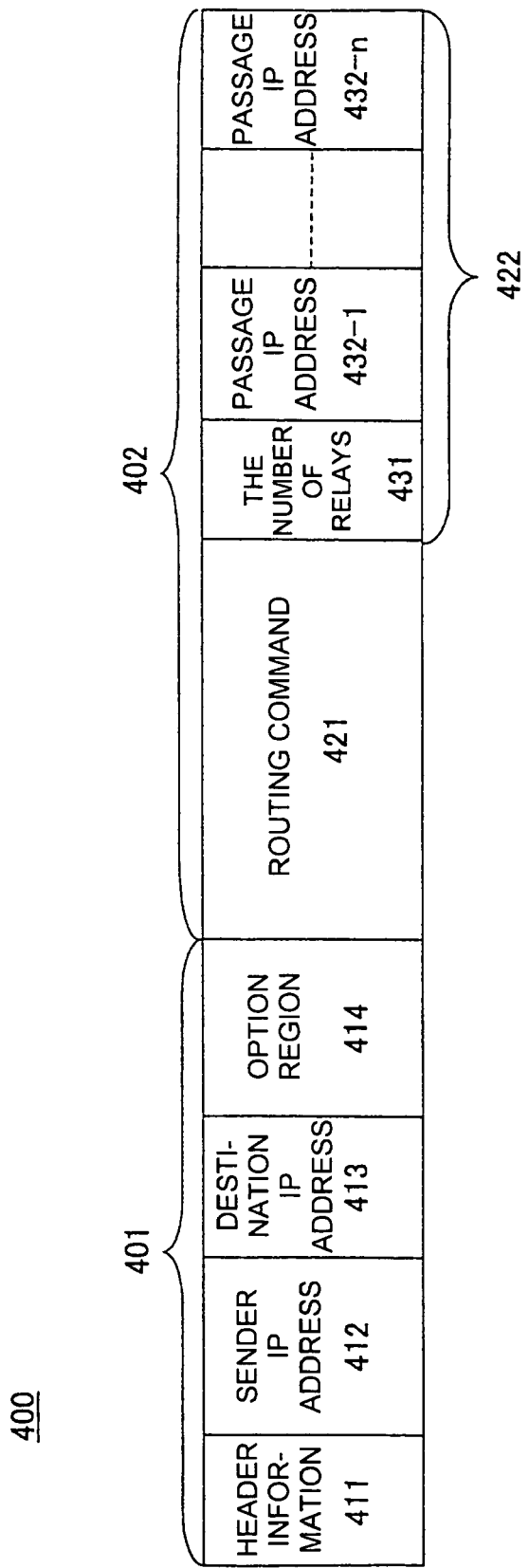
FIG. 14 is a diagram showing a data structure of a packet containing a routing command.

FIG. 14 is a diagram showing a data structure of a packet containing a routing command.

A routing command 400 consists of a header section 401 and a data section 402. The header section 401 contains header information 411 such as an identification number of a datagram, an IP address 412 of a sending computer, and an IP address 413 of a destination computer. Furthermore, the header section 401 has an option region 414. A user is allowed to record information in the option region 414.

The data section 402 contains a routing command 421 and an address history information 422. The routing command 421 is a command for searching a routing to obtain the optimum communication route. The address history information 422 stores the number 431 of relays and IP addresses 432-1 to 432-n of the relayed routers Rt. The address history information 422 is updated every time when the packet passes through a router Rt.

By sending the above-mentioned routing command 400 from the client 301 to the node server 303, the node server 303 can obtain the address history information 422 from the client 301 to the node server 303. In addition, by sending it from the content server 303 to the client 301, the client 301 can obtain the address history information 422 from the content server 304 to the client 301. This address history information 422 is used as route information from the client 301 to the node server 303 or route information from the content server 304 to the client 301.

The client 301 obtains from the node server 303, at the time of sending a request, route information from the client 301 to the node server 303, creates the route information according to the obtained address history information 422, adds it to the request, and send them.

Figure 15:
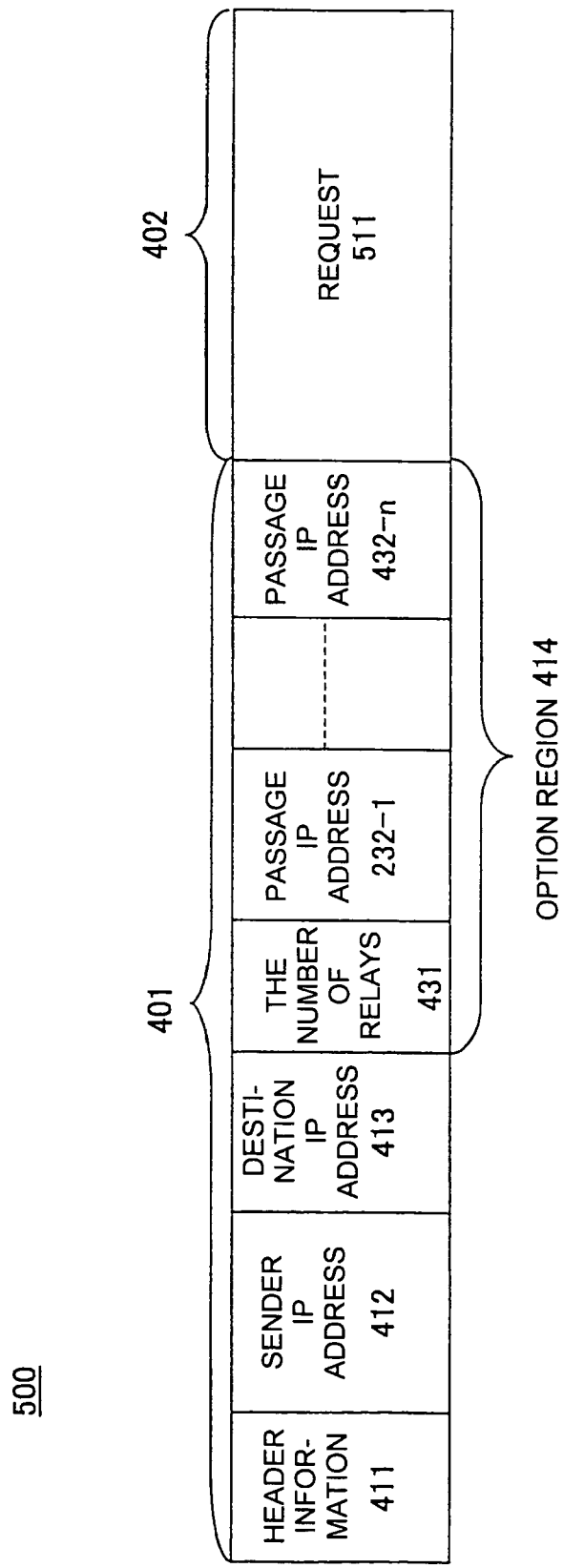
FIG. 15 is a diagram showing a data structure of a packet containing a request from a client 301 to a node server 303.

FIG. 15 is a diagram showing a data structure of a packet including a request to be sent from the client 301 to the node server 303. In the figure, similar components and parts to those in FIG. 13 are depicted by like reference numerals and description thereof will be omitted.

In a packet 500 including a request to be sent from the client 301 to the node server 303, for example, the option region 414 of the header section 401 contains the number 431 of relays and the IP addresses 432-1 to 432-n of the relayed routers Rt. In addition, a request 511 is set in the data section 402.

The router Rt refers to the option region 414 of the header section 401 to determine the subsequent route. It should be noted that, when a content is supplied from the content server 304 to the client 301, the content may be transmitted through a desired route by setting the content in the data section 402 in place of the request.

The request to be supplied from the client 301 to the node server 303 is supplied to the node server 303 through the router(s) Rt corresponding to the routing address(es) that is/are associated with the request. In addition, the content to be supplied from the content server 304 to the client 301 is supplied to the client 301 through the router(s) Rt corresponding to the routing address(es) that is/are associated with the content.

Next, operation of each router Rt is described.

Figure 16:
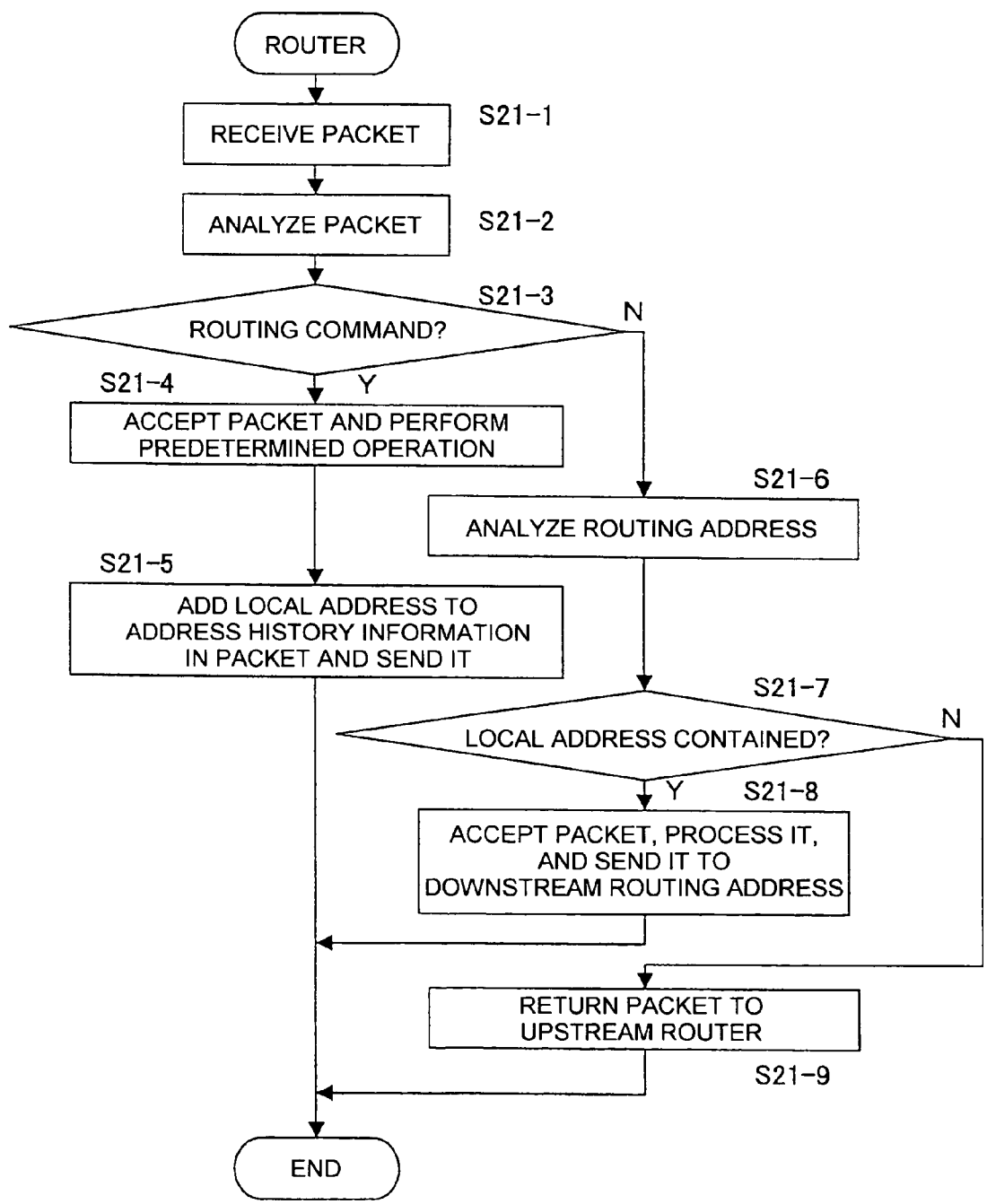
FIG. 16 is a diagram showing a data structure of a packet containing a content from a content server 304 to a client.

FIG. 16 shows an operation flowchart for a router Rt.

When receiving a packet in step S21-1, the router Rt analyzes the received packet in step S21-2. The router Rt determines in step S21-3 whether the received data is a routing command or not according to the result of the analysis.

When the result of the determination in step S21-3 indicates that it is the routing command, the router Rt accepts the received packet and performs a predetermined operation, in step S21-4. Then, the router Rt adds its local IP address to the address history information in the routing command in the packet and sends the packet to a downstream communication route L, in step S21-5. In this event, the router Rt finds the optimum communication route L according to the destination IP address in the packet and sends the packet.

By repeating the above-mentioned steps S21-1 to S21-5, a route from the client 301 to the node server 303 can be detected. The detected route may be named and stored in a route table provided in the node server 303.

FIG. 17 is a diagram showing a data structure of a route table.

A route table 600 contains IP addresses A11 to A1m . . . An1 to Anm of the passed routers Rt for respective route names R1 to Rn.

The node server 303 has a route information table for each route stored in the route table 600.

FIG. 18 is a diagram showing a data structure of a route information table.

A route information table 700 has information related to routes stored therein for respective route names R1, R2, . . . , Rn. The information may be, for example, information about periods of time T11 to T12 . . . Tn1 to Tn2 during which comfortable use is allowed, data transfer rates S1 to Sn, and response times Tres1 to Tresn.

The node server 303 refers to the route information table 700 in answer to a request from the client 301, finds the optimum route, reads the routing address of it from the route table 600, and supplies it to the client 301.

The client 301 puts the routing address received from the node server 303 into the option region 414 of the packet and sends a request.

It should be noted that the route table 600 and the route information table 700 in this embodiment are kept in the node server 303, but they may be kept in the client 301.

Now, returning to FIG. 16, description continues.

When the packet supplied is not the routing command in step S21-3, that is, for example, when it is a packet in which a request or a content is set as data, the routing address information 432-1 to 432-*n* in the option region 414 within the packet is analyzed in step S21-6.

Next, in step S21-7, it is determined whether the routing address contains the IP address of the local router Rt according to the result obtained in step S21-6. When, in step S21-7, the IP address of the local router Rt is contained in the routing address, the subject router is considered as being the router Rt which the packet should pass through. The router accepts the packet, performs a predetermined operation, and thereafter, sends the packet to a subsequent routing address(es), in step S21-8.

When, in step S21-7, the IP address of the local router Rt is not contained in the routing address information 432-1 to 432-*n*, then the router returns the received packet to the packet sending router Rt in step S21-9. The packet sending router Rt sends the packet to another downstream communication route L.

By repeating the operations in the above-mentioned steps S21-1 to S21-3 and S21-6 to S21-9 by the routers Rt, the packet from the client 301 is supplied to the node server 303 through a predetermined route.

Likewise, the node server 303 sends a routing command through the content server 304 to the client 301 according to a request from the client 301. This makes it possible to obtain a route from the content server 304 to the client 301. By managing the route table 600 and the route information table 700 in the client 301 and supplying the routing address to the node server 303 upon a request for example, the route for the content to be supplied from the content server 304 to the client 301 can be optimized.

It should be noted that the routing address obtained in the client 301 may be supplied to the node server 303 by the routing command from the content server 304 and the node server 303 may manage the route table 600 and the route information table 700 for determining the route from the content server 304 to the client 301. In such a case, the optimum routing address is provided along with a push request to the content server 304 upon a request from the client 301. The content server 304 adds the routing address to the option region 414 of the packet containing the content to be supplied to the client 301 and sends the content. This allows the content to be supplied to the client 301 through the optimum route designated by the routing address.

If the route designated by the routing address is congested, a satellite may be used to bypass the congested portion in the network 302.

Figure 19:
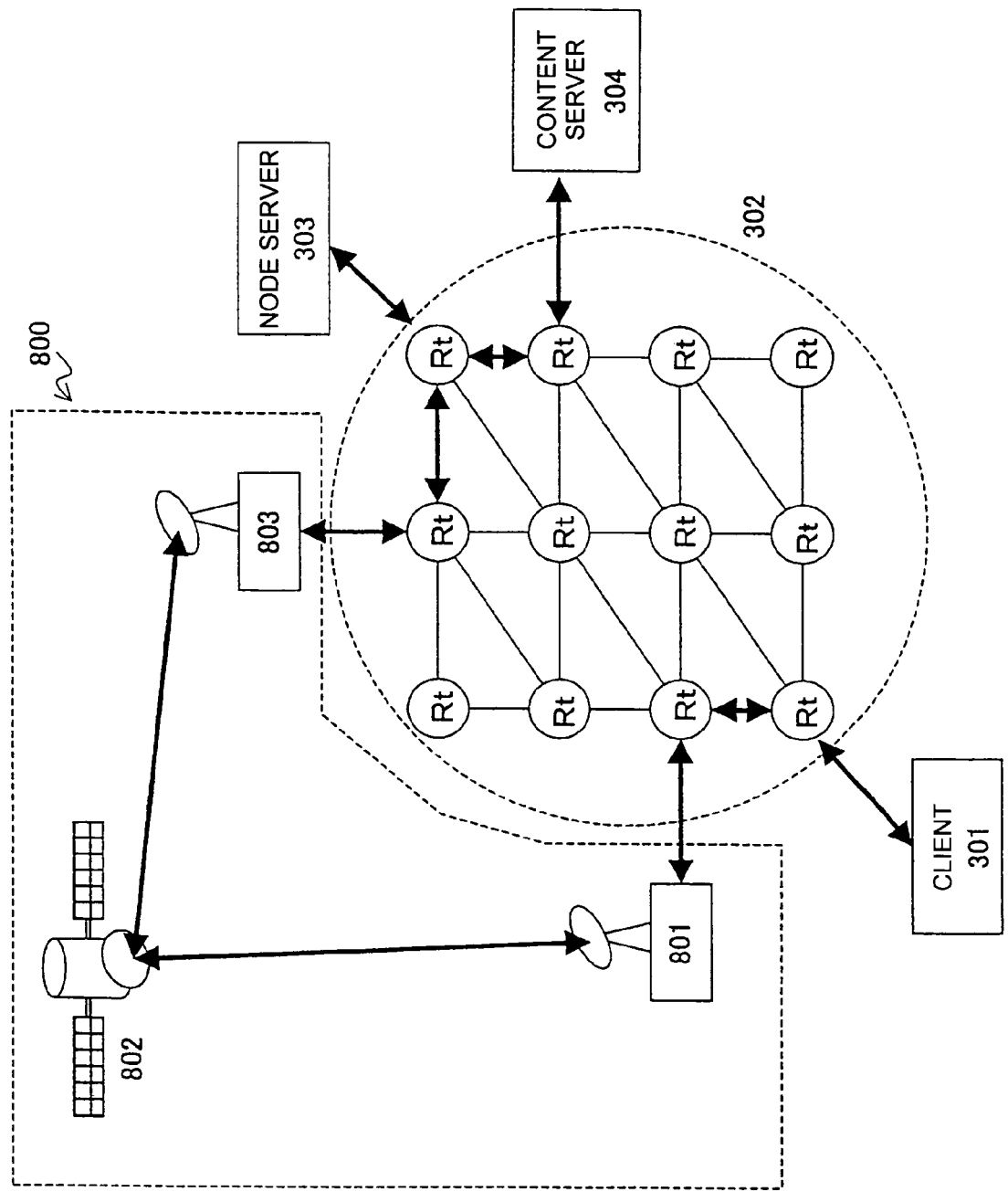
FIG. 19 is a diagram showing a system configuration of a modified version of the second embodiment of the present invention.
Figure 20:
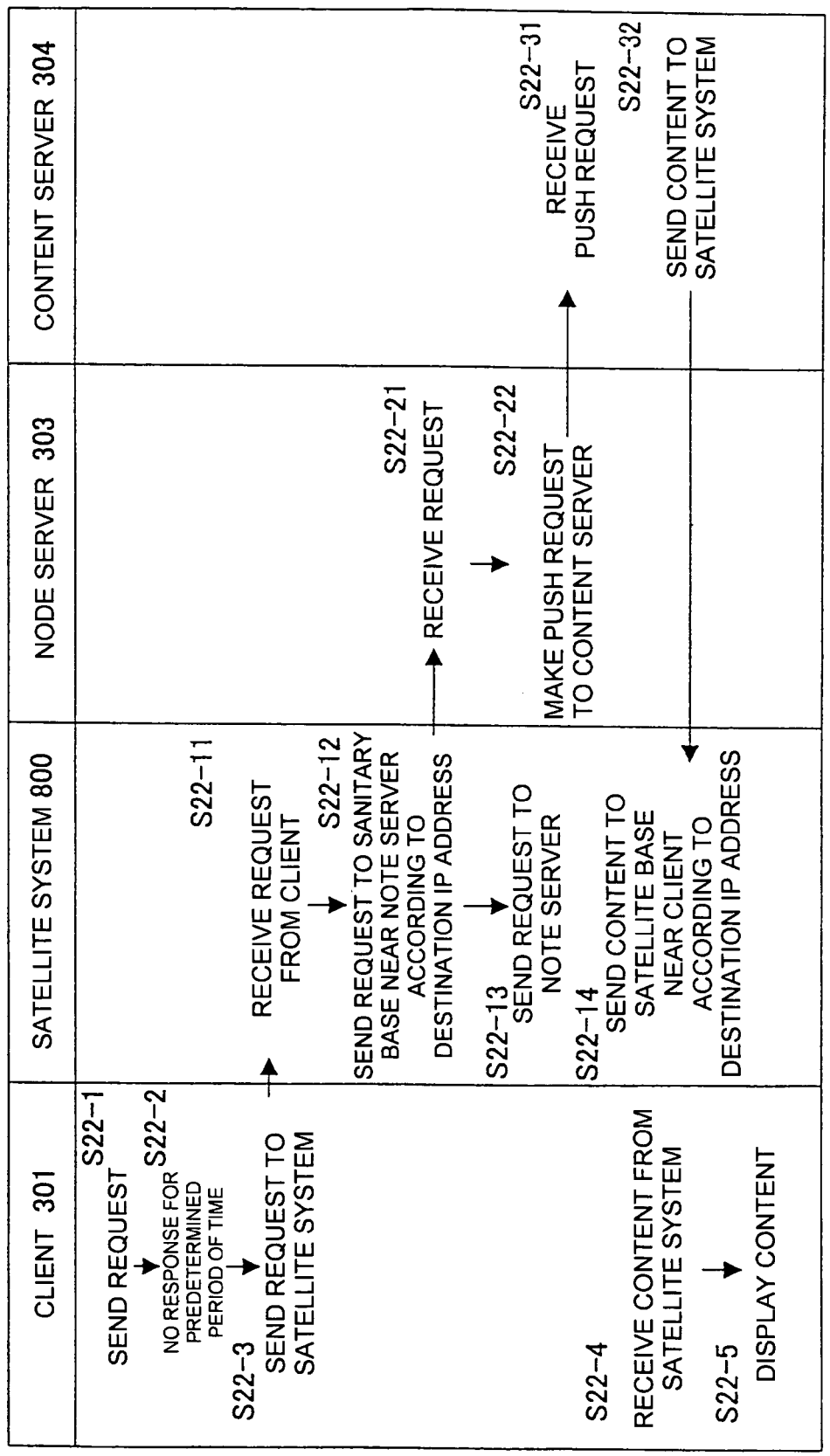
FIG. 20 is a diagram for explaining the operation of the modified version of the second embodiment of the present invention.

FIG. 19 is a diagram showing a system configuration of a modified version of one embodiment of the present invention. FIG. 20 is a diagram for explaining the operation of the modified version of one embodiment of the present invention. In these figures, similar components and parts to those in FIG. 13 are depicted by like reference numerals, and description thereof will be omitted.

This modified version is featured by comprising a satellite communication system 800.

If no response is made for a predetermined period of time in step S22-2 after the client 301 makes a request to the node server 303 in step S22-1, the client 301 sends a request to a satellite base 801 that is provided nearby in step S22-3. When the satellite base 801 receives the request from the client 301 in step S22-11, it sends the request from the client 301 to a satellite base 803 near the node server 303 through the satellite 802 in step S22-12. In this event, the satellite base 801 determines the satellite base 803 according to the destination IP address of the request. The satellite base 803 sends the request to the node server 303 according to the destination IP address of the request in step S22-13.

In addition, when the node server 303 receives the request from the satellite base 803 in step S22-21, it sends a push request to the content server 304 according to the request supplied from the satellite base 803 in step S22-22. When the content server 304 receives the request from the node server 303 in step S22-31, it sends a content toward the client 301 according to the push request from the node server 303 in step S22-32. The content from the content server 304 is first supplied to the satellite base 803 provided nearby. The satellite base 803 sends the content to the satellite base 801 near the client 301 through the satellite 802 in step S22-14. In this event, the satellite base 803 determines the satellite base 801 according to the destination IP address of the content. The satellite base 801 sends the content to the client 301 according to the destination IP address of the content.

When the client 301 receives the content from the satellite base 801 in the step 22-4, it displays the received content in step S22-5.

As described above, by sending requests or contents using the satellite system 800, contents can be exchanged at a high speed regardless of the status of the network 302.

It should be noted that the network 302 detects congestion and uses the satellite system 800 automatically in this modified version, but the satellite system 800 may be utilized when necessary through the operation by a user of the client 301, or a node server 303, or a content server 304. This makes it possible to provide contents without fail regardless of the state of the network 302.

Alternatively, contents may be downloaded to a node server depending on the frequency of accesses in order to immediately cope with a request from a client.

Third Embodiment

Figure 21:
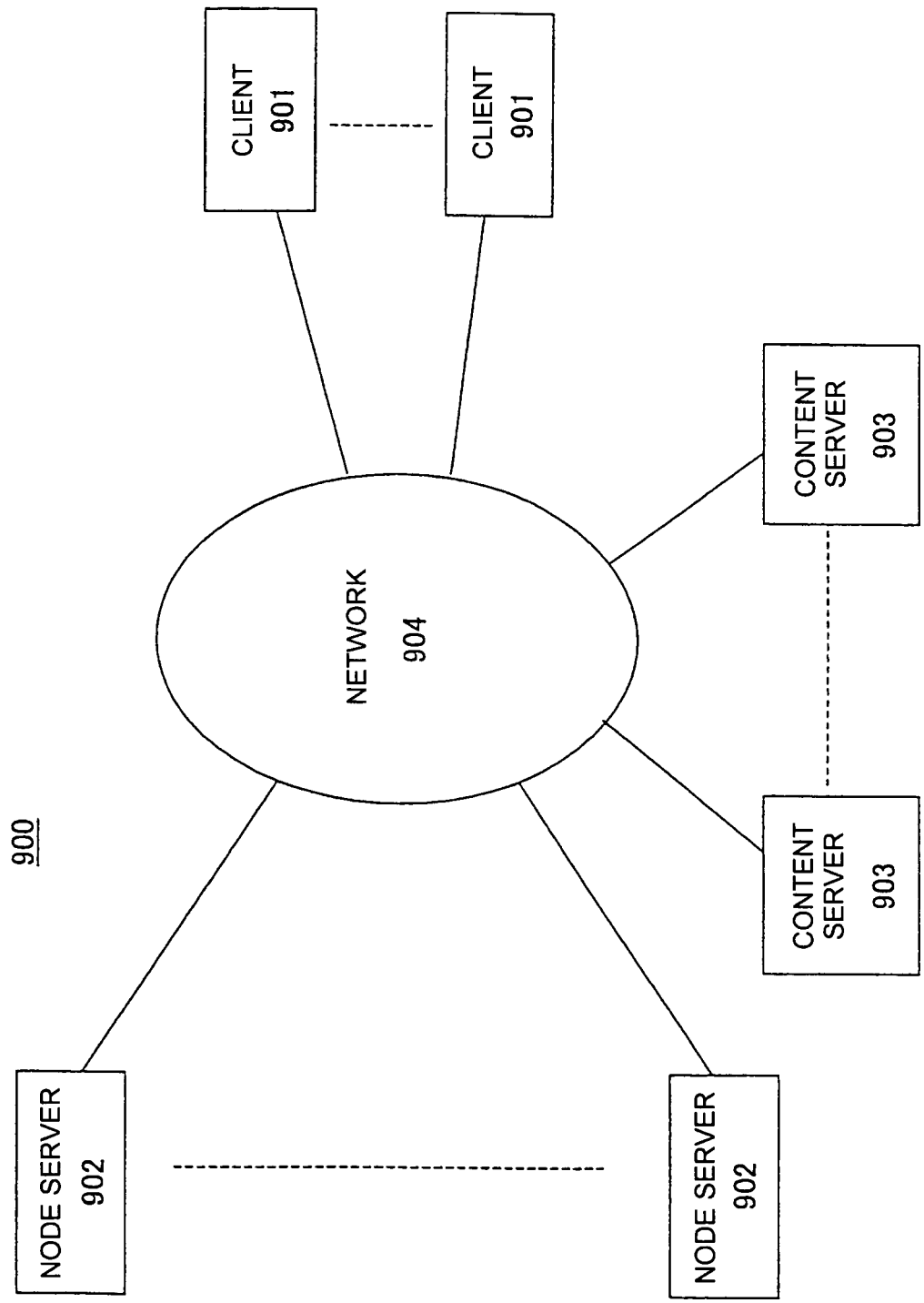
FIG. 21 is a diagram showing a system configuration according to a third embodiment of the present invention.
Figure 22:
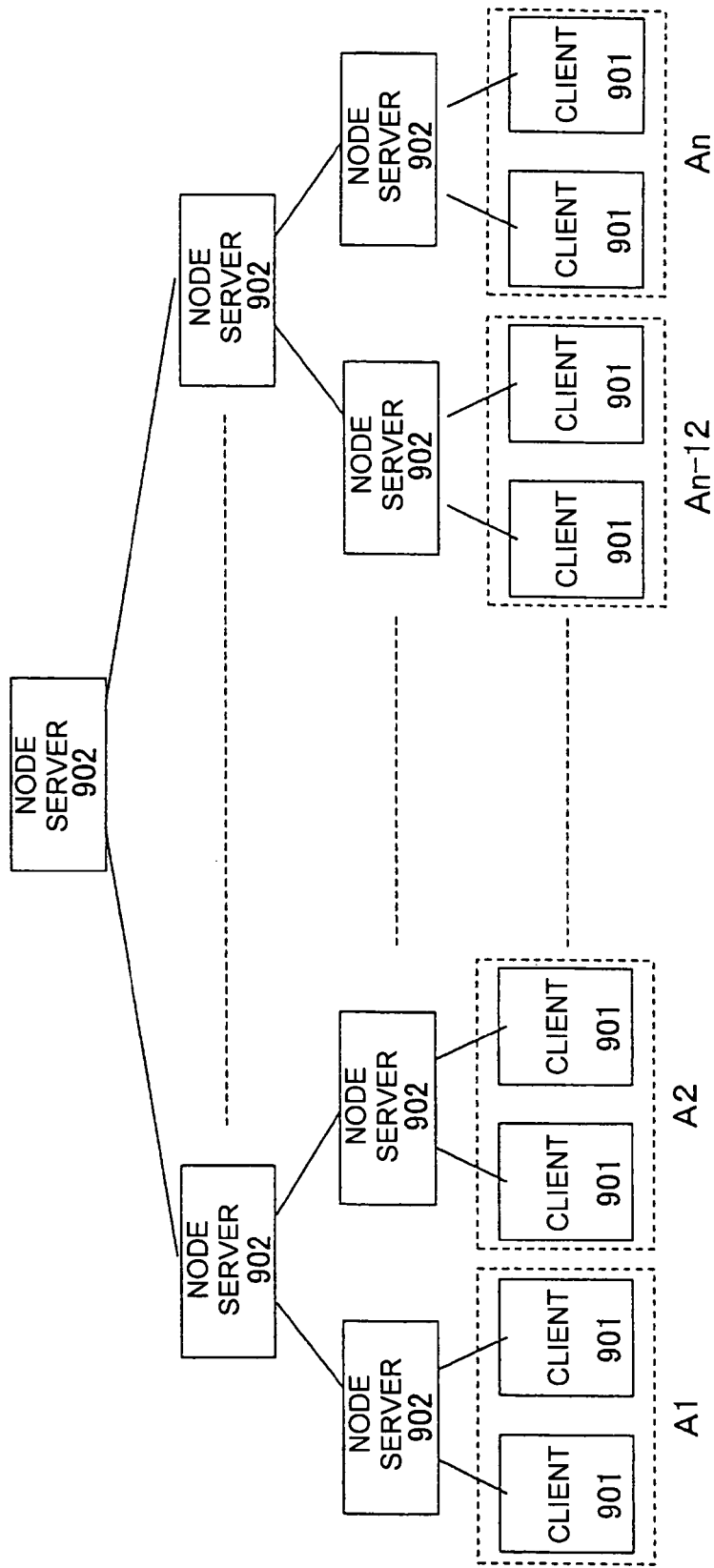
FIG. 22 is a diagram illustrating a hierarchical structure of node servers.

FIG. 21 is a diagram showing a system configuration of a third embodiment of the present invention. FIG. 22 is a diagram showing a hierarchical structure of a node server.

A content exchange system 900 of this embodiment has a configuration in which clients 901, node servers 902, and content servers 903 are connected through a network 904.

The node server 902 may have a hierarchical structure on a regional basis as shown in FIG. 22. The client 901 usually makes a request to a node server 902 at the lowest level. The node server 902 has an address table, a cache table, and a statistics table. It makes a push request to the content server(s) 903 and also makes a request to a node server(s) 902 at the upper or lower level(s) according to these tables.

The node server 902 first refers to the address table according to the request from the client 901.

FIG. 23 is a diagram showing a data structure of an address table.

The address table 911 contains, for each content, URLs of the content servers 903 from which the content is supplied, call destination addresses of the cache table, and link destination addresses to the node servers 902 that manage the content.

When the node server 902 is designated by the request from the client 901 and a content C1 on a channel ch1 is designated, it refers to the cache table address of a corresponding portion in the address table 911. The cache table address of the content C1 on the channel ch1 is considered to be a valid address. Therefore, it then refers to data of a corresponding cache table address in the cache table.

When an invalid cache table address is stored as in a content C2 on the channel ch1 of the address table 911 shown in FIG. 23, this is a case where that node server 902 does not manage the content that is asked for. In such a case, a link destination address L2 of the node server 902 is indicated. The request from the client 901 is supplied to the node server 902 at the link destination address L2.

FIG. 24 is a diagram showing a data structure of a cache table.

A cache table 912 contains, for each address, a directory name, information indicating validity of the cache, and time stamp information. When the content C1 on the channel ch1 is designated, the cache table address adr11 in the cache table 912 is referred to. The directory name of the cache table address adr11 in the cache table 912 is d1, the validity is "O", the time stamp is t11. This indicates that the content C1 is cached in a storage device having the directory name d1 at the time instant t11, and the data is currently valid. Thus, the content C1 can be obtained by reading the data from the storage device having the directory name of d1. It should be noted that the storage device corresponds to the caching means described in claims.

In this case, the node server 902 is only required to send the cached content C1 directly to the client 901. It is unnecessary to make a push request to the content server 903. The validity of "X" in the cache table 912 indicates, for example, a timeout content. Such a content is deleted first and thereafter is read from the content server 903 and cached again. The re-cached content is supplied to the client 901. In addition, the validity of the cache table 912 is changed to "O" by the update to the latest content.

It should be noted that the node server 902 can cache only a limited volume of data, so that the data to be cached are determined according to a statistics table.

FIG. 25 is a diagram showing a data structure of a statistics table.

A statistics table 913 has a configuration in which data such as a content name, a link destination, the number of retrievals, an access time, and a volume are stored for each rank level. The rank in the statistics table 913 may be, for example, determined in order of the number of retrievals.

For example, contents up to the rank "5" are cached. The statistics table is updated in the number of retrievals and the access time according to a request from the client 901, and the rank is updated according to the number of retrievals.

Next, operations in the node server 902 are described in detail.

Figure 26:
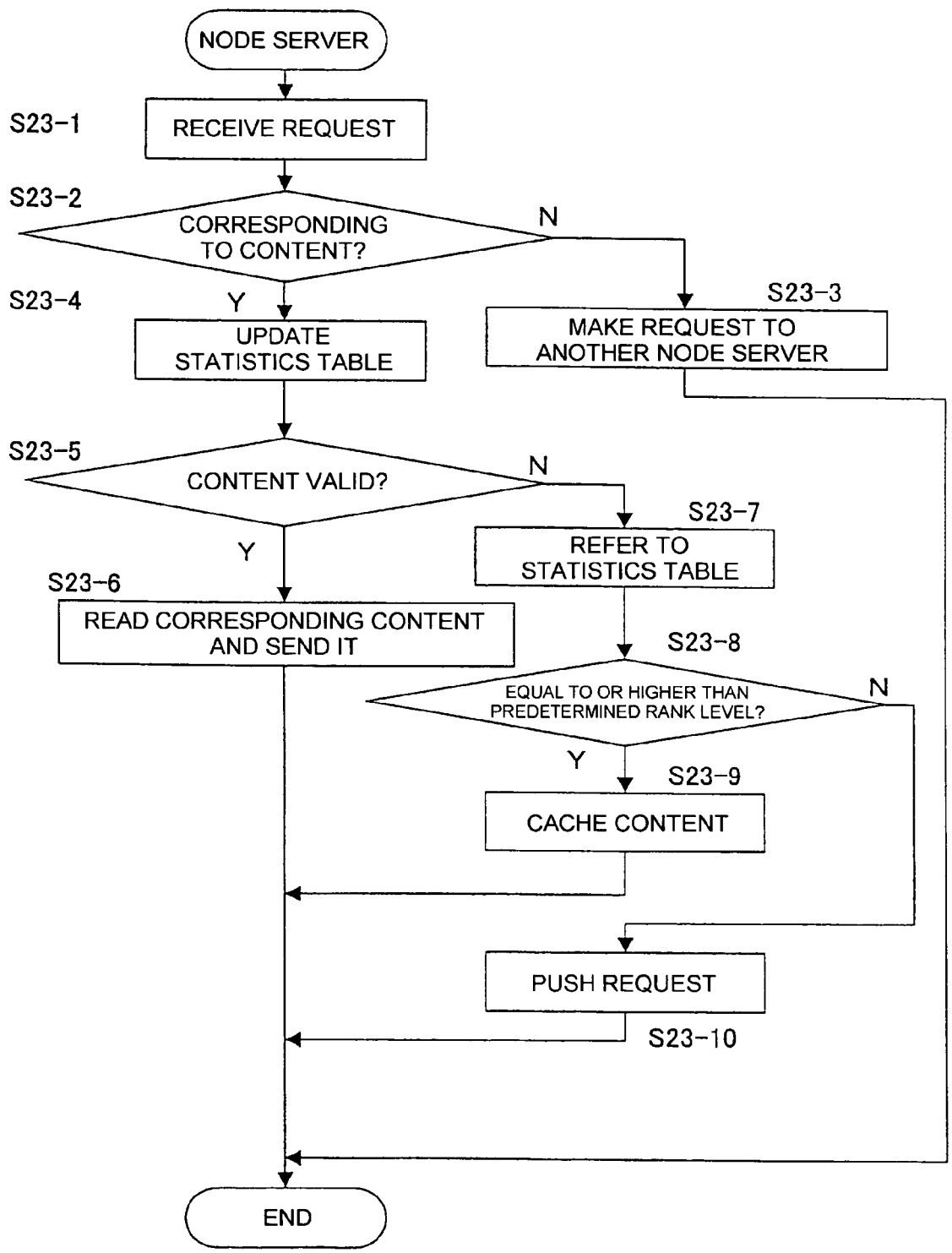
FIG. 26 is a process flowchart that is performed by a node server 902.

FIG. 26 shows a process flowchart of the node server 902.

When receiving a request from the client 901 in step S23-1, the node server 902 refers to the address table 911 and determines whether the content that is asked for by the request is under the management of the local node server 902, in step S23-2. The determination in step S23-2 may be done according to, for example, the validity of the node server address in the address table 911. The state in which a valid link destination address is stored in the node server address indicates that the content that is asked for is under the management of the link destination node server 902, so that the request is sent to the link destination node server in step S23-3.

On the other hand, when step S23-3 indicates that the content that is asked for is under the management of the local node server 902, the statistics table 913 is updated. Next, the node server refers to the cache address table 912 in step S23-5 in order to determine whether the cached content is valid or not.

When, in step S23-5, the cached content is valid, the node server reads the content from the storage device having the directory name designated by the cache address table 912 and sends it to the client 901, in step S23-6.

When, in step S23-5, the cached content is invalid, then the node server refers to the statistics table 913 in step S23-7 and determines whether the rank of the content that is asked for is equal to or higher than a predetermined rank in step S23-8. By referring to the address table 911, the node server reads the content from the content server 903 and then caches the content that is read from the content server 903 in step S23-8.

When the rank of the content that is asked for is equal to or lower than the predetermined rank in step S23-8, then the address table 911 is referred to in step S23-10 to issue a push request to the content server 903 that provides the corresponding content. The content server 903 reads the content in response to the push request from the node server 902 and supplies it to the client 901.

As described above, the contents that are retrieved many times can be supplied from the node server 902 directly to the client 901. Therefore, contents can be exchanged at a high speed.

It should be noted that the node server 902 may redundantly have address tables 911 of the node servers 902 in the upper and lower levels thereof.

Figure 27:
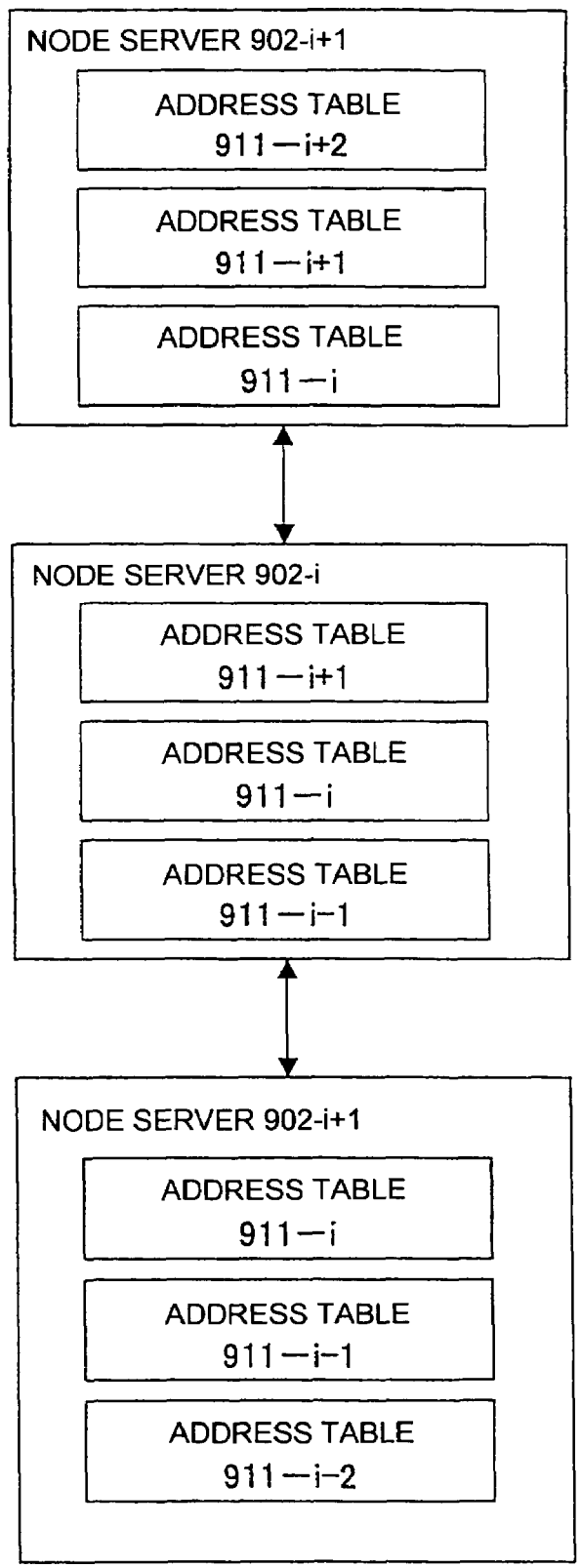
FIG. 27 is a configuration diagram of essential parts which is applied to a case where a node server 902 contains address tables 911 at the upper and lower levels of the hierarchical structure.

FIG. 27 is a configuration diagram of essential parts which is applied to a case where the node server 902 contains address tables 911 at the upper and lower levels of the hierarchical structure.

As shown in FIG. 27, a node server 902-*i* contains the address tables 911 of the node servers 902-*i*+1 and 902-*i*–1 at the upper and lower levels of the hierarchical structure. This makes it possible to use the node server 902-*i* in place of the function of the node servers 902-*i*+1 and 902-*i*–1 in case where they are not available for some reasons. This increases reliability of the system.

The invention claimed is:

1. An information exchange method used for furnishing, according to an instruction from a server, to terminal devices, a given number of pieces of real-time and/or live streaming video information out of a plurality of pieces of real-time and/or live streaming video information that are gathered by a plurality of information gathering devices, comprising:

said server being adapted to link each of said terminal devices to the information gathering device that gathers a given number of pieces of real-time and/or live streaming video information that are asked for from its linked terminal device, out of said plurality information gathering devices, said server being also adapted to direct the information gathering devices to deliver the given number of pieces of real-time and/or live streaming video information to their linked terminal device, each of said terminal devices being adapted to produce video image including a given number of real-time and/or live streaming video images that are received from the predetermined number of information gathering devices and display it on a predetermined certain screen wherein said server sends to each of said terminal devices a link destination setting table containing links to said information gathering devices, each of said terminal devices accesses its linked information gathering device(s) according to its link destination setting table, wherein said server or said information gathering devices hold(s) the link destination setting tables that have been sent to each of said terminal devices, each of said terminal devices being adapted to send its link destination setting table and a requested entry contained in its link destination setting table to said server or said information gathering devices, said server or said information gathering devices comparing the link destination setting table that is sent from the each of said terminal devices to a previously registered link destination setting table for the each of said terminal devices contained in said server or said information gathering devices, wherein when the link destination setting table sent from the each of said terminal devices is not the same as the previously registered link destination setting table, linking to an information gathering device associated with the requested entry is not permitted.

2. The information exchange method as claimed in claim 1, wherein said information gathering device is a content server that provides a desired content to said terminal device.

3. The information exchange method as claimed in claim 1, wherein a first terminal device comprises a first link destination setting table that contains a first set of link destinations, wherein a second terminal device comprises a second link destination setting table that contains a second set of link destinations different from the first set of link destinations, and wherein the first and the second terminal devices are only permitted to link to information gathering devices that are specified in the respective first and second set of link destinations.

4. The information exchange method as claimed in claim 3, wherein the previously registered link destination table is updated regularly.

5. The information exchange method as claimed in claim 1, wherein the previously registered link destination table is updated regularly.

6. An information processor used for furnishing, to terminal devices, a given number of pieces of streaming video information out of a plurality of pieces of real-time and/or live streaming video information that are gathered by a plurality of information gathering devices, comprising:

acceptance means for accepting a request from each of said terminal devices;

linking means for linking each of said terminal devices to the information gathering device that gathers a given number of pieces of real-time and/or live streaming video information that are asked for from its linked terminal device, out of said plurality of information gathering devices, in response to a request that has been accepted by said acceptance means from each of said terminal devices;

link destination setting table sending means for sending, to each of said terminal devices, a link destination setting table having link destinations, each of said terminal devices being permitted to link to said information gathering devices that are specified by said link destinations in its respective link destination setting table; and access control means that holds a link destination setting table that has been sent to each of said terminal devices as a previously registered link destination table for each of said terminal devices, said access control means comparing the previously registered link destination setting table that is held therein with a link destination setting table that is sent with a requested entry contained in the sent link destination setting table from each terminal device of said terminal devices, wherein when the link destination setting table sent from the each terminal device is not the same as the previously registered link destination setting table for that terminal device, linking to an information gathering device associated with the requested entry is not permitted.

7. The information processor as claimed in claim 6, wherein a first terminal device comprises a first link destination setting table that contains a first set of link destinations, wherein a second terminal device comprises a second link destination setting table that contains a second set of link destinations different from the first set of link destinations, and wherein the first and the second terminal devices are only permitted to link to information gathering devices that are specified in the respective first and second set of link destinations.

8. The information processor as claimed in claim 7, wherein the previously registered link destination table is updated regularly.

9. The information processor as claimed in claim 6, wherein the previously registered link destination table is updated regularly.

10. An information gathering system comprising:

a plurality of information gathering devices that gather real-time and/or live streaming video information; and a server which is adapted to accept a request from a terminal device and to link said terminal device to the information gathering device that gathers the real-time and/or live streaming video information that is asked for from said terminal device, said server being also adapted to direct said information gathering device to send the real-time and/or live streaming video information to said terminal device, wherein said server sends a link destination setting table to said terminal device, the link destination setting table containing links to said information gathering devices, said terminal device accesses its linked information gathering device(s) according to the link destination setting table, wherein said server or said information gathering devices hold(s) the link destination setting table that has been sent to said terminal device as a previously registered link destination setting table, said terminal device being adapted to send a link destination setting table and a requested entry contained in the link destination setting table to said server or said information gathering devices, said server or said information gathering devices comparing the previously registered link destination setting table that is held therein with the link destination setting table that is sent from said terminal device, wherein when the link destination setting table sent from the terminal device is not the same as the previously registered link destination setting table, linking to an information gathering device associated with the requested entry is not permitted.

11. The information gathering system as claimed in claim 10, wherein a first terminal device comprises a first link destination setting table that contains a first set of link destinations, wherein a second terminal device comprises a second link destination setting table that contains a second set of link destinations different from the first set of link destinations, and wherein the first and the second terminal devices are only permitted to link to information gathering devices that are specified in the respective first and second set of link destinations.

12. The information gathering system as claimed in claim 11, wherein the previously registered link destination table is updated regularly.

13. The information gathering system as claimed in claim 10, wherein the previously registered link destination table is updated regularly.

14. An information gathering system comprising:

a plurality of information gathering devices that gather real-time and/or live streaming video information; and a server which is adapted to accept a request from a terminal device and to direct the information gathering device that gathers real-time and/or live streaming video information that is asked for from said terminal device, to send the real-time and/or live streaming video information to said terminal device, wherein said server sends a link destination setting table to said terminal device, the link destination setting table containing links to said information gathering devices, said terminal device accesses its linked information gathering device(s) according to the link destination setting table, wherein said server or said information gathering devices hold(s) the link destination setting table that has been sent to said terminal device as a previously registered link destination setting table, said terminal device being adapted to send a link destination setting table and a requested entry contained in the sent link destination setting table to said server or said information gathering devices, said server or said information gathering devices comparing the previously registered link destination setting table that is held therein with the link destination setting table that is sent from said terminal device, wherein when the link destination setting table sent from the terminal device is not the same as the previously registered link destination setting table, linking to an information gathering device associated with the requested entry is not permitted.

15. The information gathering system as claimed in claim 14, wherein a first terminal device comprises a first link destination setting table that contains a first set of link destinations, wherein a second terminal device comprises a second link destination setting table that contains a second set of link destinations different from the first set of link destinations, and wherein the first and the second terminal devices are only permitted to link to information gathering devices that are specified in the respective first and second set of link destinations.

16. The information gathering system as claimed in claim 15, wherein the previously registered link destination table is updated regularly.

17. The information gathering system as claimed in claim 14, wherein the previously registered link destination table is updated regularly.

* * * * *